United States Patent
Edge

(10) Patent No.: US 8,340,626 B2
(45) Date of Patent: Dec. 25, 2012

(54) SYSTEM AND METHOD FOR SUPPORTING VOICE CALL CONTINUITY FOR VOIP EMERGENCY CALLS

(75) Inventor: Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1221 days.

(21) Appl. No.: 11/740,220

(22) Filed: Apr. 25, 2007

(65) Prior Publication Data

US 2007/0254625 A1 Nov. 1, 2007

Related U.S. Application Data

(60) Provisional application No. 60/795,774, filed on Apr. 28, 2006, provisional application No. 60/796,669, filed on May 1, 2006, provisional application No. 60/815,738, filed on Jun. 21, 2006.

(51) Int. Cl.
 *H04M 11/04* (2006.01)
(52) U.S. Cl. ............ 455/404.1; 455/415; 455/436; 455/432.1
(58) Field of Classification Search .......... 455/404.1, 455/415, 436, 432.1
 See application file for complete search history.

(56) References Cited

U.S. PATENT DOCUMENTS

| | | | |
|---|---|---|---|
| 2003/0026245 A1* | 2/2003 | Ejzak | 370/352 |
| 2005/0233727 A1* | 10/2005 | Poikselka et al. | 455/404.2 |
| 2006/0291487 A1* | 12/2006 | Naqvi et al. | 370/401 |
| 2007/0014281 A1* | 1/2007 | Kant | 370/352 |
| 2007/0149166 A1* | 6/2007 | Turcotte et al. | 455/404.1 |

FOREIGN PATENT DOCUMENTS

| | | |
|---|---|---|
| WO | 03009627 | 1/2003 |
| WO | 03049467 | 6/2003 |
| WO | WO2006078212 A1 | 7/2006 |
| WO | WO2007072462 | 6/2007 |

OTHER PUBLICATIONS

International Search Report—PCT/US07/067825—International Search Authority—European Patent Office—Nov. 12, 2007.
3PP: "Voice call continuity between CS and IMS; Stage 2 (Release 7)" 3GPP TS 23.206 Vo. 4.0, Apr. 20, 2006, XP007903327.
"IP Multimedia subsystem emergency sessions (Release 7)" 3GPP 23.167 V7.0.0, Mar. 27, 2006, XP007903328.
X.P0049-000-0 "All-IP Emergency Services", 3rd Generation Partnership Project 2 (3GPP2), Version 0.20, Mar. 2007, pp. 1-30.

(Continued)

*Primary Examiner* — Kwasi Karikari
(74) *Attorney, Agent, or Firm* — Francois Pelaez; Kristine Ekwueme

(57) ABSTRACT

A system and method are disclosed to support Voice Call Continuity (VCC) for emergency calls. The system includes a VCC Application in a visited internet-protocol multimedia subsystem (IMS) to facilitate domain transfers between the IMS subsystem and a circuit-switched (CS) subsystem. The system further includes an emergency call session control function (E-CSCF) subsystem in the visited IMS subsystem that is operatively coupled to the VCC Application to facilitate domain transfers between the IMS subsystem and the CS subsystem.

47 Claims, 18 Drawing Sheets

OTHER PUBLICATIONS

3GPP: "3rd Generation Partnership Project; Technical Specification Group Services and System Aspects; Feasibility Study on Voice Call Continuity Suipport for Emergency Calls (Release 8)" 3GPP Draft; 23826-030-Diffmarked, 3RD Generation Partnership Project (3GPP), Mobile Competence Centre; 650, Route Des Lucioles; F-06921 Sophia-Antipolis Cedex; France, Nov. 19, 2007, XP050262527 abstract, p. 8, paragraph 6.—p. 40, paragraph 6.3.4.4. (3GPP TR 23.826 V0.3.0 (Nov. 2007).

3GPP: "Voice call continuity between CS and IMS study—TR 23.806 V7.0.0 (Dec. 2005)" XP002438622, abstract, p. 16, paragraph 6.—p. 93, paragraph 6.5.8.

International Search Report and Written Opinion—PCT/US2009/030008, International Search Authority—European Patent Office, Apr. 23, 2009 (080506WO).

Written Opinion—PCT/US07/067825, International Search Authority, European Patent Office, Nov. 12, 2007.

3GPP TS 22.101 7.5.0, 3rd Generation Partnership Project; Technical Specification Group Services and System Aspects Service aspects; Service principles (Release 7), 3GPP, Mar. 2006 URL, ftp://ftp.3gpp.org/Specs/archive/22_series/22.101/22101-750.zip.

* cited by examiner

SYSTEM AND METHOD FOR SUPPORTING VOICE CALL CONTINUITY FOR VOIP EMERGENCY CALLS

CLAIM OF PRIORITY UNDER 35 U.S.C. §119

The present Application for Patent claims the benefit of the following U.S. Provisional Patent Applications: (1) U.S. Provisional Application Ser. No. 60/795,774, filed on Apr. 28, 2006, entitled "SUPPORT OF VCC FOR VOIP EMERGENCY CALLS," by Stephen Edge; (2) U.S. Provisional Application Ser. No. 60/796,669, filed May 1, 2006, entitled "SUPPORT OF VCC FOR VOIP EMERGENCY CALLS," by Stephen Edge; and (3) U.S. Provisional Application Ser. No. 60/815,738, filed on Jun. 21, 2006, entitled "SYSTEM AND METHOD FOR SUPPORTING VOICE CALL CONTINUITY FOR VOIP EMERGENCY CALLS," by Stephen Edge and assigned to the assignee hereof and hereby expressly incorporated by reference herein.

BACKGROUND

1. Field

This disclosure relates generally to a system and method to effectively support Voice Call Continuity (VCC) for Voice-Over-IP (VoIP) emergency calls.

2. Background

Voice Call Continuity (VCC) is a feature that is being standardized by the Third Generation Partnership Project (3GPP) and by the Third Generation Partnership Project 2 (3GPP2). A definition of VCC has been produced by 3GPP in 3GPP TS 23.206 ("Voice Call Continuity between CS and IMS; Stage 2") which is a publicly available document. A definition of VCC has also been produced by 3GPP2 in 3GPP2 X.P0042-001-0 ("Voice Call Continuity between IMS and Circuit Switched Systems—Stage 2") which is also a publicly available document. Both definitions of VCC are very similar and support continuity of a voice call from a wireless terminal to some other device (wireless or non-wireless) when the wireless terminal switches between using a wireless access that supports circuit mode and a wireless access that supports VoIP. In particular, use of VCC avoids having to release a call (e.g., a circuit mode call) and re-establish a call (e.g., using VoIP) when the user switches access which would cause significant delay and disturbance to the users involved in the call and might result in an inability to re-establish the call.

Specific examples of wireless access networks that support circuit mode, sometimes referred to as the circuit switched (CS) domain, include the Global System for Mobile Communications (GSM), Universal Mobile Telecommunication System (UMTS) using wideband code division multiple access (W-CDMA) and cdma2000 1X. Examples of wireless access networks that support VoIP include UMTS W-CDMA, cdma2000 1xEV-DO (Evolution Data Optimized) and various wireless LAN (WLAN) and WiMax networks. In some cases, the same access network (e.g. UMTS W-CDMA) can support both circuit mode and VoIP, although the user's wireless terminal would be required to use just one of them (at any one time) for a particular call.

When a wireless user loses coverage for a particular wireless access network and needs to make use of another access network, it is sometimes possible to handover an ongoing call from one access network to the other without disruption of service provided the type of access (circuit mode or VoIP) remains unchanged. When the type of access needs to change, however (e.g., because the new access network does not support the previously used access type), it will normally release the call and re-establish it again using the new access type. VCC is a capability that enables handover between VoIP and circuit mode without such a disruption.

VCC is currently defined by both 3GPP and 3GPP2 for normal non-emergency calls and may not explicitly support emergency calls originated using either circuit mode or VoIP. This is because the solution being defined for VCC in both 3GPP and 3GPP2 is incompatible with the solutions defined and being defined to support circuit mode and VoIP emergency calls. The main source of this incompatibility is that the solutions to support emergency calls rely on support from the network, known as the visited network, that is currently serving the wireless user, whereas the solutions for VCC require VCC support in the user's home network even when different from the visited network.

The lack of VCC support for emergency calls means that such calls will have to be released and re-originated if a wireless user needs to change between use of circuit mode and use of VoIP in different access networks (or in the same access network)—e.g., because the user has moved or the current access network is congested or subject to some other anomalous condition. This may be particularly disadvantageous because if the user re-originates the call, the call may not go through to the same Public Safety Answering Point (PSAP) operator (i.e., to the same person) as before. In addition, the PSAP operator may not be able to re-originate the call if a callback number was not provided when the call was first established—e.g. if the wireless terminal is not properly authorized in the original access network. There would thus be an advantage to extending the capability of VCC to support emergency calls.

SUMMARY

As described in 3GPP TS 23.206 ("Voice Call Continuity between CS and IMS; Stage 2"), VCC is mainly supported in a new IMS (IP Multimedia Subsystem) entity known as a VCC Call Continuity Control Function (VCC CCCF) also referred to in later versions of 3GPP TS 23.206 as a VCC Application or (in certain specific contexts) as a Domain Transfer Function. As described in the 3GPP2 draft X.P0042-001-0 ("Voice Call Continuity between IMS and Circuit Switched Systems—Stage 2"), VCC is supported by a VCC Application Server (VCC AS), which is an entity similar to the 3GPP VCC Application. Both the 3GPP VCC Application and 3GPP2 VCC AS are defined to be located in the calling wireless user's home network. This definition is incompatible with the current solution for VoIP IMS Emergency calls defined in 3GPP TS 23.167 and with the 3GPP2 solution being defined in 3GPP2 X.P0049-000-0 ("All-IP Emergency Services") where IMS VoIP emergency call support is restricted to the visited network. As such, it would not be possible to support VCC for IMS Emergency calls unless a new method of VCC is defined for the visited network or unless IMS emergency calls are routed through the home network.

The method disclosed here uses the former alternative since home network support of IMS Emergency calls would significantly change the current solution for VoIP emergency calls as well as introduce a number of new problems such as liability issues, support of visited country regulatory requirements and possibly latency issues. Such a home network based solution would also be incompatible with supporting IMS emergency calls from unauthorized users (e.g., where there is no roaming agreement between the visited and home networks). A home network solution would also be incompatible with supporting CS emergency calls since these are also supported in the visited network.

The method disclosed herein enables VCC support for emergency calls and has the following capabilities:

Supports IMS (VoIP) to circuit switched (CS) domain transfer for an emergency call that originated in either the IMS (VoIP) or CS domain Supports CS to IMS (VoIP) domain transfer for an emergency call that originated in either the IMS (VoIP) or CS domain Supports authorized wireless User Equipment (UE)

Supports an unauthorized UE—where the UE is not authorized to use an access network for non-emergency calls Supports a UE when in the home network and when roaming Provides continuing support of location following VCC transfer from one access network to another Support of location refers generally to the capability of a PSAP to obtain the geographic location (e.g., accurate latitude and longitude) of a wireless user who has initiated an emergency call when the call is initially made and/or at later times during the call. Such a capability is currently mandated for circuit mode emergency calls in (for example) both Europe and North America and may be mandated later for VoIP emergency calls. Continuing support for location means that after changing access type (e.g., from VoIP to circuit mode), it will still be possible for the PSAP to obtain the wireless user's location.

Other aspects, advantages and novel features of the present disclosure will become apparent from the following detailed description of the disclosure when considered in conjunction with the accompanying drawings.

BRIEF DESCRIPTION OF THE DRAWINGS

FIG. 4 illustrates an exemplary AT;

DETAILED DESCRIPTION

I. Wireless Communication System

The exemplary embodiment employs a spread-spectrum wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP2 UMB (Ultra Mobile Broadband), WiMax, or some other modulation techniques.

A system may be designed to support one or more standards such as the standard offered by a consortium named "3rd Generation Partnership Project" referred to herein as 3GPP, and embodied in a set of documents including Document Nos. TS 23.206 ("Voice Call Continuity Between CS and IMS; Stage 2 (Release 7)"), TS 23.167 ("IP Multimedia Subsystem (IMS) Emergency Sessions (Release 7)"), TS 24.008 ("Mobile Radio Interface Layer 3 Specification; Core Network Protocols; Stage 3 (Release 6)"), TS 23.271 ("Functional Stage 2 Description of Location Services (LCS) (Release 7)"), TR. 21.905 ("Vocabulary for 3GPP Specifications"), and TS 23.002 ("Network Architecture (Release 7)"); the standard offered by a consortium named "3rd Generation Partnership Project 2" referred to herein as 3GPP2, including Document Nos. X.P0042-001-0 ("Voice Call Continuity Between IMS and Circuit Switch Systems"), X.P0049-000-0 ("All-IP Emergency Services"), and X.S0024 ("IP-Based Location Services"); the TIA/EIA/ATIS J-STD-036 ("Enhanced Wireless 9-1-1 Phase II"); and relevant IETF RFC documents, including IETF RFC 3261 ("SIP: Session Initiation Protocol") and IETF RFC 2327 ("SDP: Session Description Protocol"). The standards and documents cited above are hereby expressly incorporated herein by reference.

Figure 1:
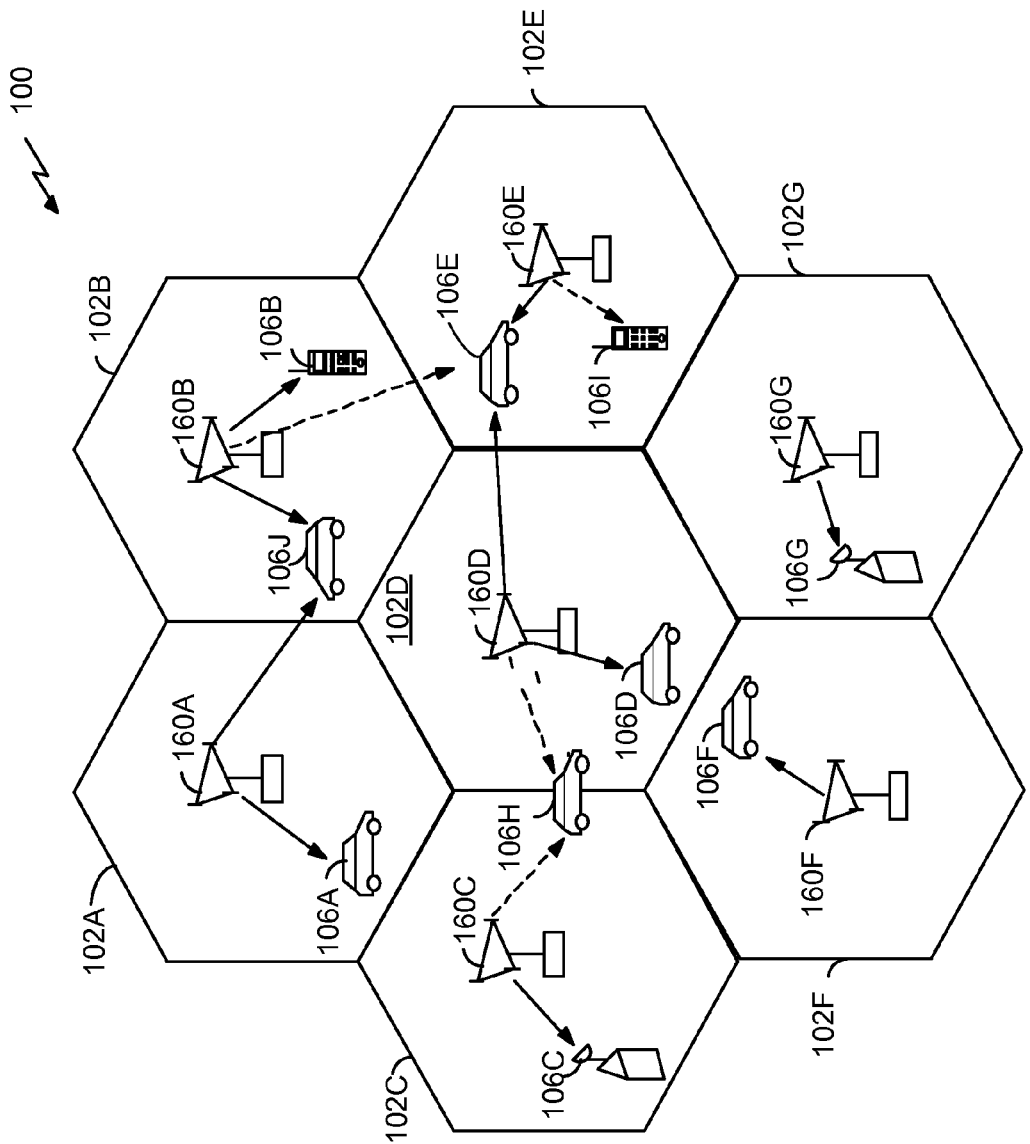
FIG. 1 illustrates an exemplary communications system 100 that supports a number of users and is capable of implementing at least some aspects and embodiments of the invention.

FIG. 1 serves as an example of a communications system 100 that supports a number of users and is capable of implementing at least some aspects and embodiments of the invention. In FIG. 1, reference numerals 102A to 102G refer to cells, reference numerals 160A to 160G refer to Node Bs and reference numerals 106A to 106J refer to access terminals or User Equipments (UE). Any of a variety of algorithms and methods may be used to schedule transmissions in system 100. System 100 provides communication for a number of cells 102A through 102G, each of which is serviced by a corresponding Node B 160A through 160G, respectively. In the exemplary embodiment, some of Node Bs 160 have multiple receive antennas and others have only one receive antenna. Similarly, some of Node Bs 160 have multiple transmit antennas, and others have single transmit antennas. There are no restrictions on the combinations of transmit antennas and receive antennas. Therefore, it is possible for a Node B 160 to have multiple transmit antennas and a single receive antenna, or to have multiple receive antennas and a single transmit antenna, or to have both single or multiple transmit and receive antennas.

Terminals (or UEs) 106 in the coverage area may be fixed (i.e., stationary) or mobile. As shown in FIG. 1, various terminals (or UEs) 106 are dispersed throughout the system.

Each terminal (or UE) 106 communicates with at least one and possibly more Node Bs 160 on the downlink and uplink at any given moment depending on, for example, whether soft handoff is employed or whether the terminal (or UE) is designed and operated to (concurrently or sequentially) receive multiple transmissions from multiple Node Bs. The downlink refers to transmission from the Node B to the terminal (or UE), and the uplink refers to transmission from the terminal (or UE) to the Node B. In the exemplary embodiment, some of terminals (or UEs) 106 have multiple receive antennas and others have only one receive antenna. In FIG. 1, Node B 160A transmits data to terminals (or UEs) 106A and 106J on the downlink, Node B 160B transmits data to terminals (or UEs) 106B and 106J, Node B 160C transmits data to terminal (or UE)106C, and so on.

Increasing demand for wireless data transmission and the expansion of services available via wireless communication technology have led to the development of specific data services. One such service is referred to as High Rate Packet Data (HRPD). An exemplary HRPD service is proposed in "EIA/TIA-IS856 cdma2000 High Rate Packet Data Air Interface Specification" referred to as "the HRPD specification." HRPD service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 1 is consistent with a wireless access type system having HRPD service.

Figure 2:
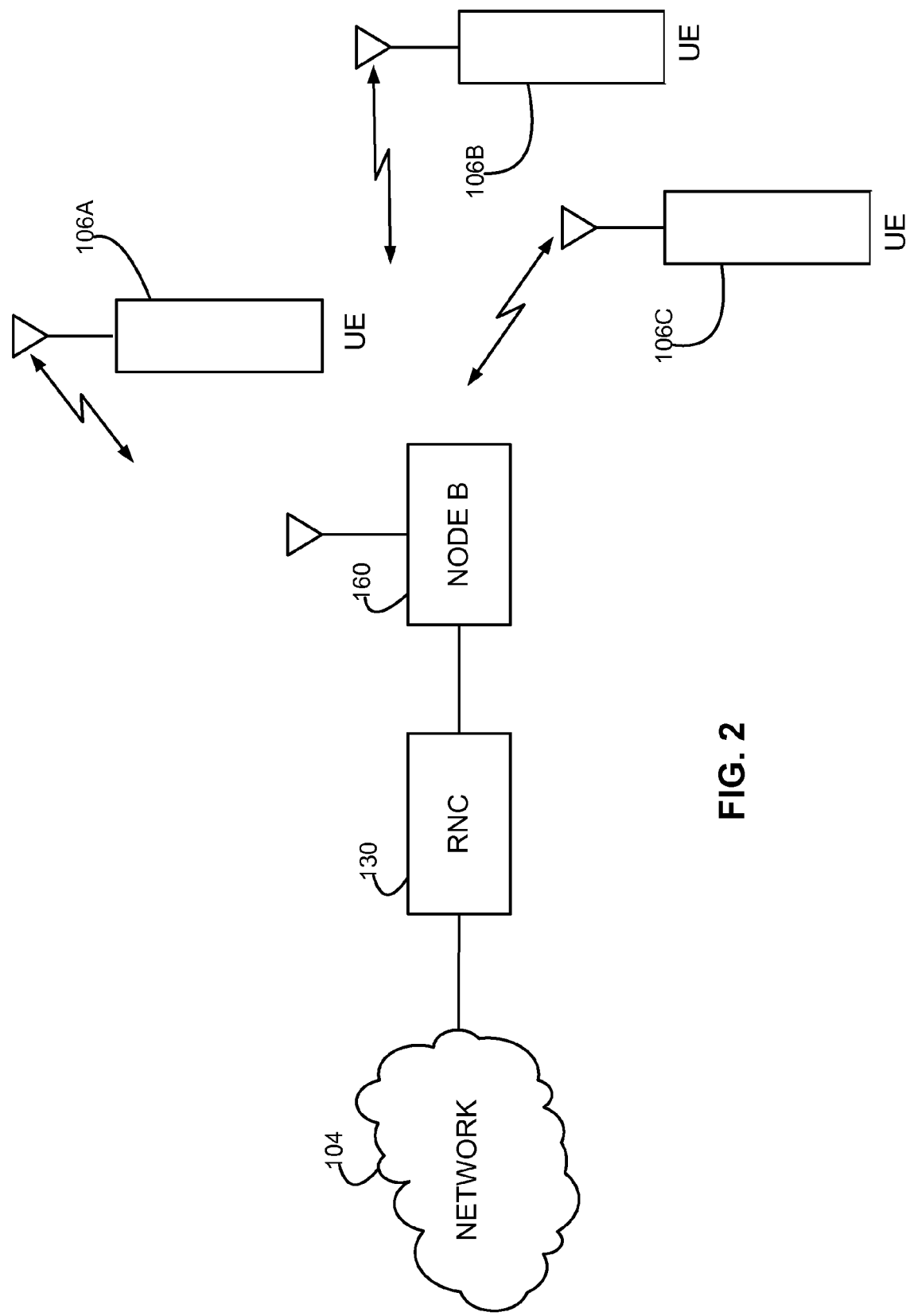
FIG. 2 is a simplified functional block diagram of an exemplary CDMA communications system.

FIG. 2 is a simplified functional block diagram of an exemplary 3GPP W-CDMA communications system. As stated above, a Radio Network Controller (RNC) (as defined in the context of 3GPP) 130 can be used to provide an interface between a network 104 and various Node Bs (as defined in the context of 3GPP) 160 dispersed throughout a geographic region. For ease of explanation, only one Node B 160 is shown. The geographic region is generally subdivided into smaller regions known as cells 102 (shown in FIG. 1). Each Node B 160 is configured to serve all User Equipment (UE) 106 in its respective cell. In some high traffic applications, the cell 102 may be divided into sectors with a Node B 160 serving each sector. In the described exemplary embodiment, three UEs 106A-C are shown in communication with the Node B 160. Each UE 106A-C may access the network 104, or communicate with other UEs 106, through one or more Node B 160 under control of the RNC 130.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications link. The channel allocations can take on various forms depending on the specific multi-access technique. By way of example, in FDMA systems in general, the total frequency spectrum is divided into a number of smaller sub-bands and each user can be given its own sub-band to access the communications link. Alternatively, as for example in the OFDMA variant of FDMA, each user can be allowed to access many different frequency channels. Alternatively, in TDMA systems, each user is given the entire frequency spectrum during periodically recurring time slots. In CDMA systems, each user is given the entire frequency spectrum for all of the time but distinguishes its transmission through the use of a code.

Figure 3:
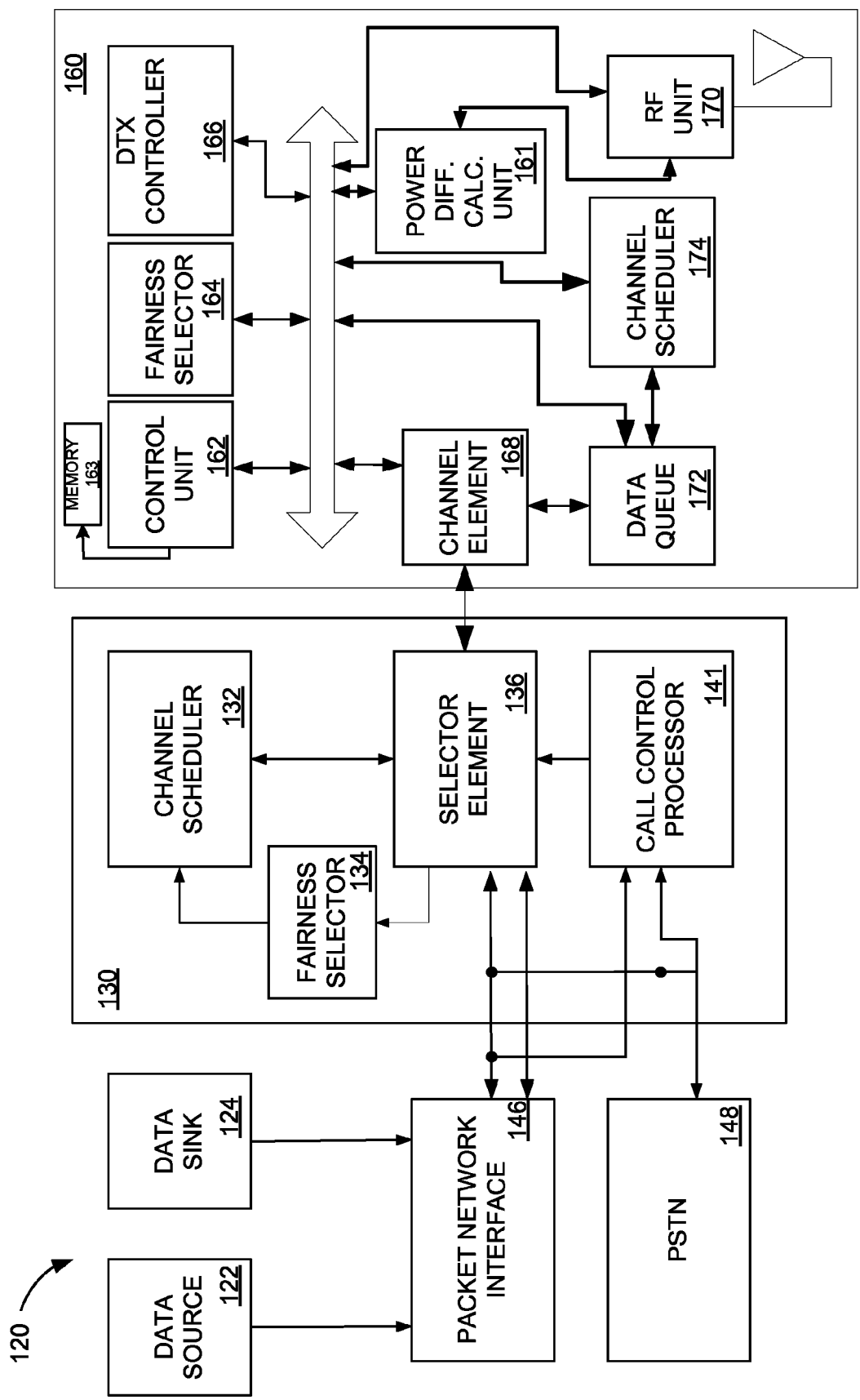
FIG. 3 is an exemplary communication system supporting the HDR transmissions and adapted for scheduling transmissions to multiple users.

One example of a communication system supporting the HRPD transmissions and adapted for scheduling transmissions to multiple users is illustrated in FIG. 3. FIG. 3 is detailed hereinbelow, wherein specifically, a Node B 160 and a RNC 130 interface with a packet network interface 146. RNC 130 includes a channel scheduler 132 for implementing a scheduling algorithm for transmissions in system 120. The channel scheduler 132 determines the length of a service interval during which data is to be transmitted to any particular remote station based upon the remote station's associated instantaneous rate for receiving data (as indicated in the most recently received DRC signal). The service interval may not be contiguous in time but may occur once every n slot. According to one embodiment, the first portion of a packet is transmitted during a first slot at a first time and the second portion is transmitted 4 slots later at a subsequent time. Also, any subsequent portions of the packet are transmitted in multiple slots having a similar 4 slots spread, i.e., 4 slots apart from each other. According to an embodiment, the instantaneous rate of receiving data Ri determines the service interval length Li associated with a particular data queue.

In addition, the channel scheduler 132 selects the particular data queue for transmission. The associated quantity of data to be transmitted is then retrieved from a data queue 172 and provided to the channel element 168 for transmission to the remote station associated with the data queue 172. As discussed below, the channel scheduler 132 selects the queue for providing the data, which is transmitted in a following service interval using information including the weight associated with each of the queues. The weight associated with the transmitted queue is then updated.

RNC 130 interfaces with packet network interface 146, Public Switched Telephone Network, Public Switched Telephone Network (PSTN), 148, and all Node Bs in the communication system (only one Node B 160 is shown in FIG. 2B for simplicity). RNC 130 coordinates the communication between remote stations in the communication system and other users connected to packet network interface 146 and PSTN 148. PSTN 148 interfaces with users through a standard telephone network (not shown in FIG. 2B).

RNC 130 contains many selector elements 136, although only one is shown in FIG. 2B for simplicity. Each selector element 136 is assigned to control communication between one or more Node Bs and one remote station (not shown). If selector element 136 has not been assigned to a given remote station, call control processor 141 is informed of the need to page the remote station. Call control processor 141 then directs Node B 160 to page the remote station.

Data source 122 contains a quantity of data, which is to be transmitted to a given remote station. Data source 122 provides the data to packet network interface 146. Packet network interface 146 receives the data and routes the data to the selector element 136. Selector element 136 then transmits the data to each Node B 160 in communication with the target remote station. In the exemplary embodiment, each Node B 160 maintains a data queue 172, which stores the data to be transmitted to the remote station.

The data is transmitted in data packets from data queue 172 to channel element 168. In the exemplary embodiment, on the forward link, a "data packet" refers to a quantity of data which is a maximum of 1024 bits and a quantity of data to be transmitted to a destination remote station within a predetermined "time slot" (such as ≈1.667 msec). For each data packet, channel element 168 inserts the control fields. In the exemplary embodiment, channel element 168 performs a Cyclic Redundancy Check, CRC, encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The forward link signal is transmitted over the air through an antenna to the forward link.

At the remote station 106, the forward link signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at Node B 160, specifically the de-interleaving, decoding, and CRC check functions. The decoded data is provided to a data sink.

Figure 4:
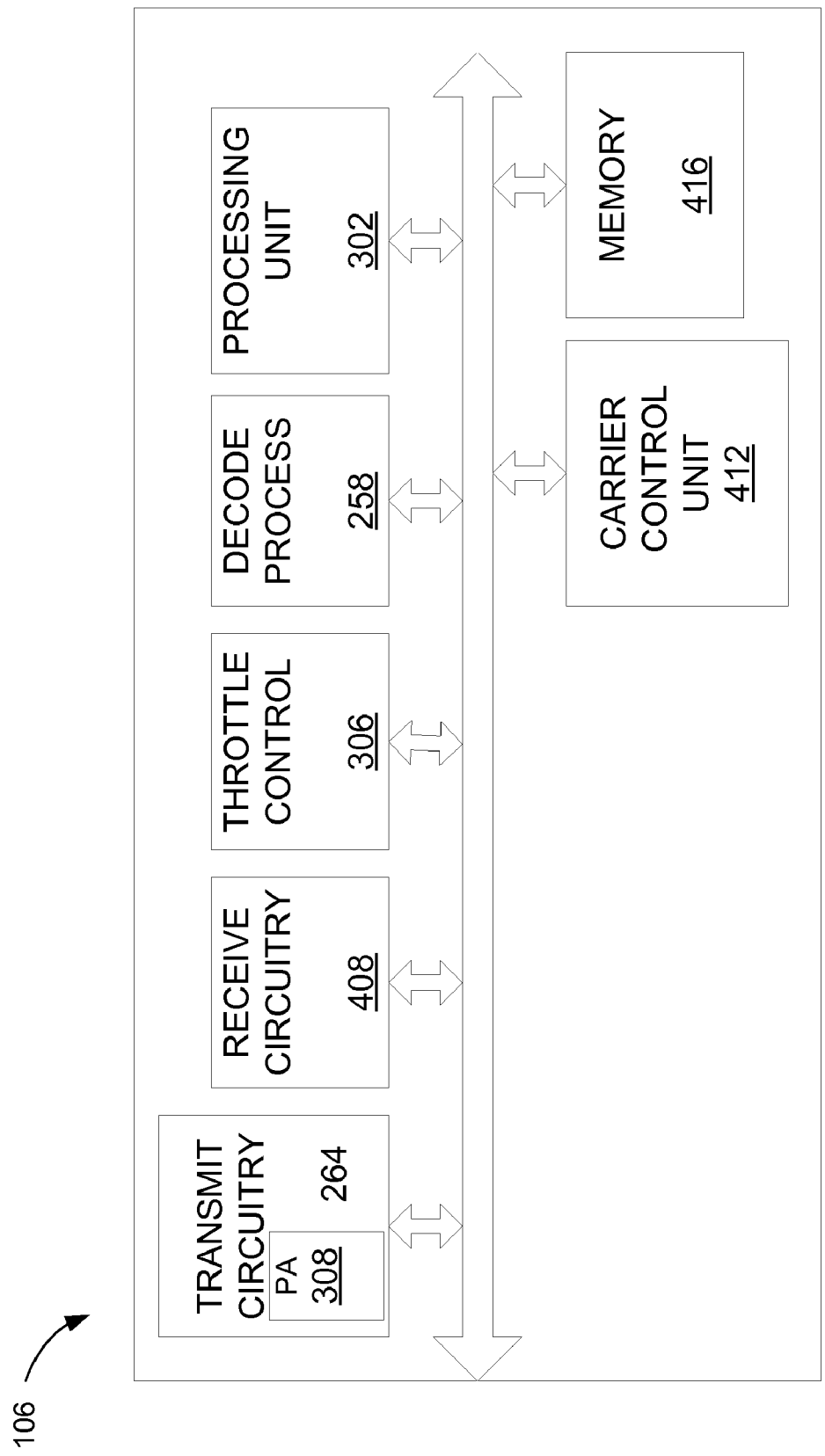

FIG. 4 illustrates another embodiment of an UE (in a 3GPP context) or AT (in a 3GPP2 context) 106 according to the present patent application in which the UE or AT 106 includes transmit circuitry 264 (including PA 308), receive circuitry 408, throttle control 306, decode process unit 258, processing unit 302, carrier control unit 412 and memory 416. The throttle control unit 306 implements at least one set of throttle rules, such as those illustrated above. Throttle rules provide means and methods for controlling transmit power on the RL.

In the following discussion, the invention will be described mainly in the context of the 3GPP architecture reference model. However, it is understood that with the disclosed information, one skilled in the art could easily adapt for use and implement aspects of the invention in a 3GPP2 network architecture or in other network architectures.

II. Architecture Reference Model

Figure 5A:
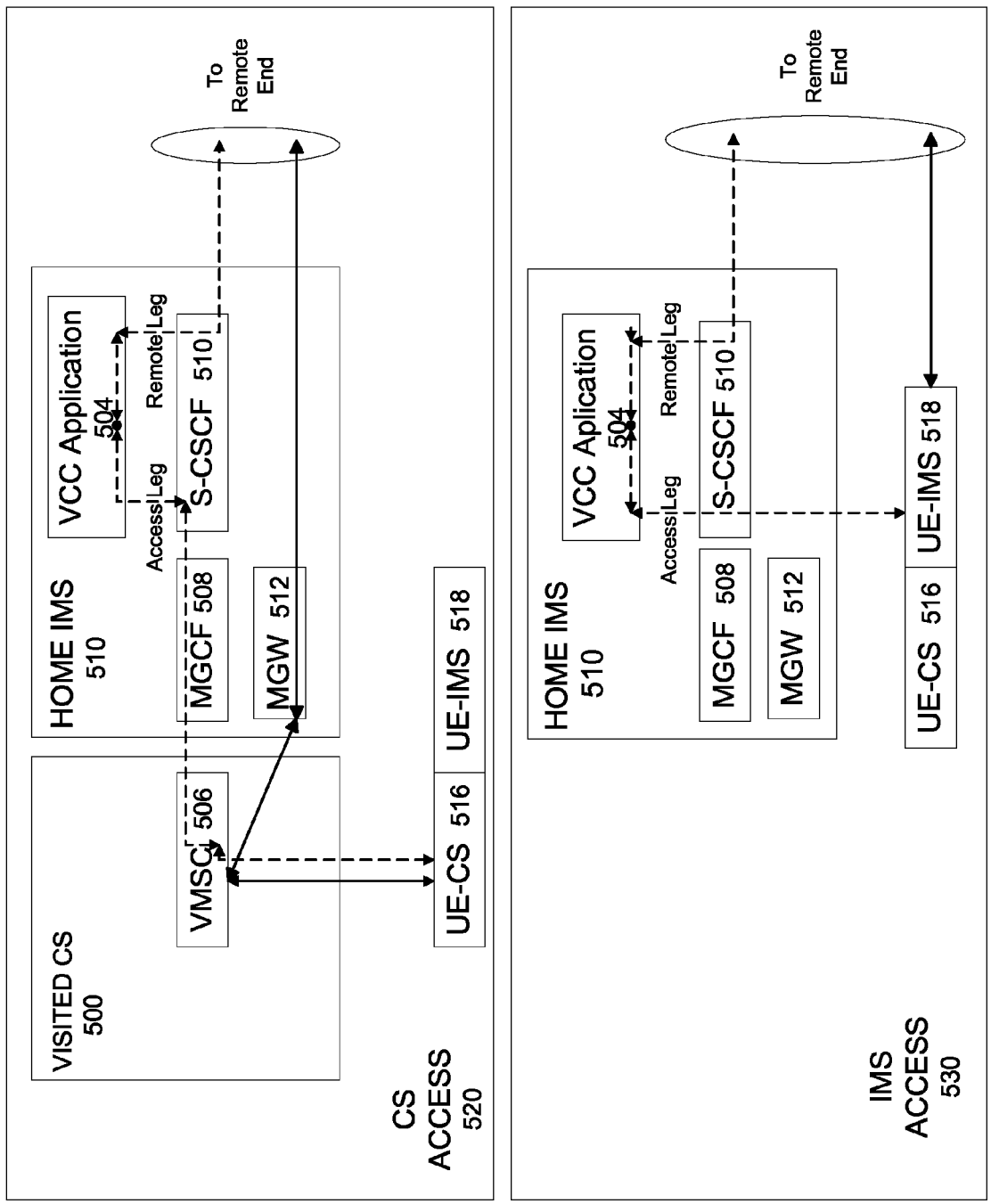
FIG. 5A illustrates a standard reference model for a 3GPP implementation (as disclosed in 3GPP TS 23.206)

FIG. 5A shows a reference model for a 3GPP implementation (as disclosed in 3GPP TS 23.206) to enable domain transfer procedures. In general, domain transfer procedures enable voice continuity between CS domain 500 and IP based domain 510 while maintaining an active voice session when using a VCC capable UL 516 and 518. All Domain Transfer procedures associated with a VCC subscriber call including initial and subsequent transfers are executed and controlled in the user's home IMS network 510 by the Domain Transfer Function (DTF), which forms part of VCC Application 504 in FIG. 5A.

As shown in FIG. 5A, static anchoring techniques are employed to establish a 3 pcc (3rd party call control) function for VCC subscriber voice calls using a VCC capable UE 516 and 518 at the DTF upon session establishment. The DTF is invoked as part of originating or terminating Initial Filter Criteria (iFC) execution at the VCC subscriber's S-CSCF 514. The DTF inserts itself in the signaling path of the VCC subscriber's voice calls made using VCC UE 516 and 518 by employing a Routing 3 pcc function. For an originating voice session, the DTF terminates an Access Leg from the user and establishes a Remote Leg toward the remote end; for a terminating voice session, the DTF terminates a Remote Leg from the remote end and establishes an Access Leg toward the user. The DTF subsequently coordinates the call control signaling exchange between the Access Leg and the Remote Leg associated with a VCC subscriber voice call.

As shown in FIG. 5A, 3 pcc exists at the DTF when the Access Leg is established via the CS domain 500 and IMS 510 respectively to illustrate its use for precondition of Domain Transfer procedures. FIG. 5A illustrates the 3 pcc at the DTF and its use for Domain Transfer procedures, hence it only shows the signaling and bearer components relevant to the enablement and execution of Domain Transfers.

Figure 5B:
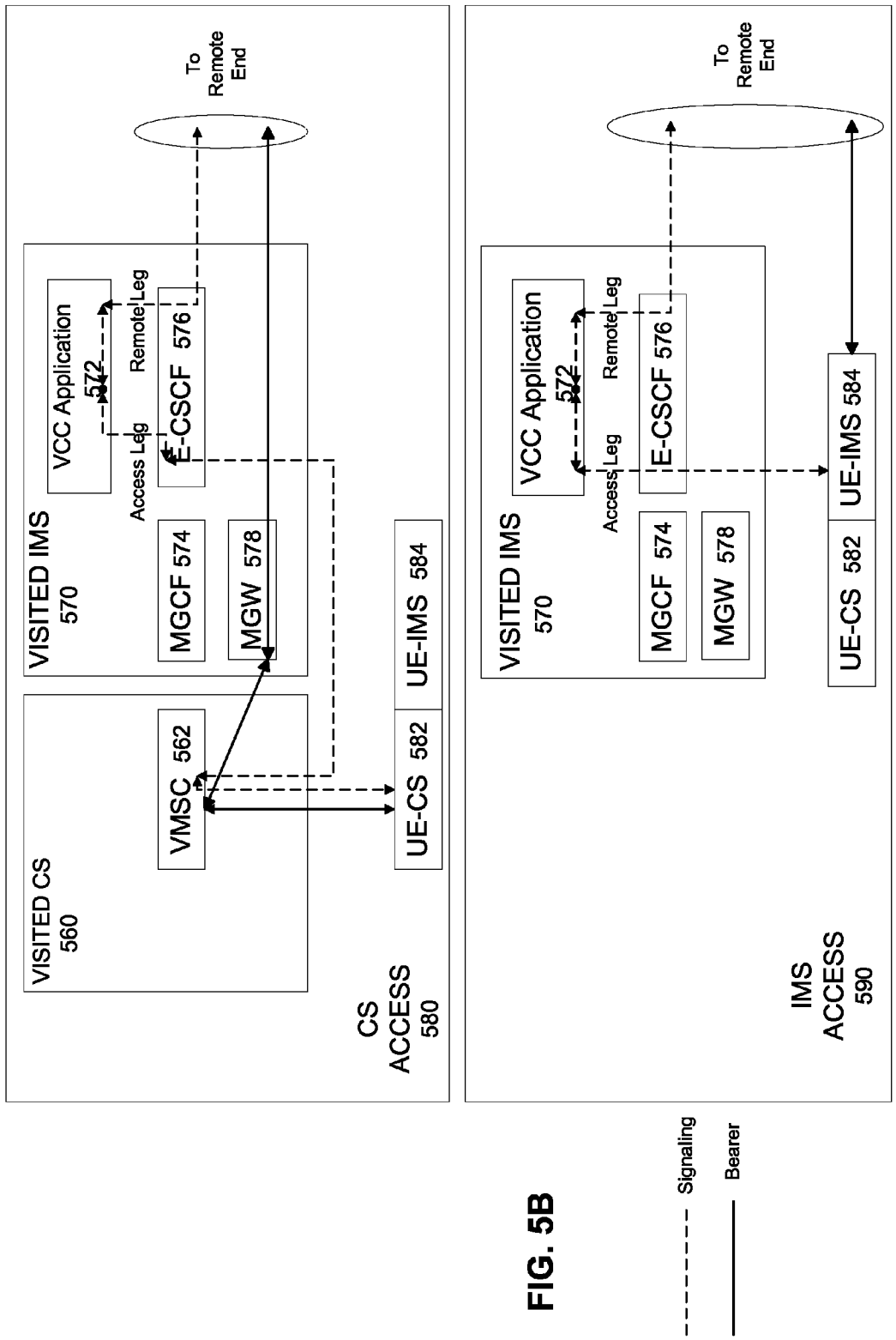
FIG. 5B illustrates a modified reference model that is in accordance with the invention, and that is different from the standard model (as disclosed in 3GPP TS 23.206 and shown in FIG. 5A) for normal VCC.

FIG. 5B shows an exemplary reference model for 3GPP that is different from the standard 3GPP reference model (disclosed in 3GPP TS 23.206 and shown in FIG. 5A) for normal VCC. The differences to the reference model in 3GPP TS 23.206 to support VCC for IMS (VoIP) emergency calls include using a VCC Application 572 in the visited network rather than a VCC Application (shown as element 504 in FIG. 5A) in the home and using an Emergency Call Session Control Function (E-CSCF defined in 3GPP TS 23.167) 576 in the visited network rather than the Serving CSCF (S-CSCF; shown as element 514 in FIG. 5A) in the home network as in 3GPP TS 23.206. The visited network Proxy CSCF (P-CSCF) is also part of the model though is not shown in FIG. 5B. Note that VCC Application 572 in FIG. 5B may also be referred to as a VCC Call Continuity Control Function(CCCF), a VCC Application Server (VCC AS) or a Domain Transfer Function (DTF).

Figure 6A:
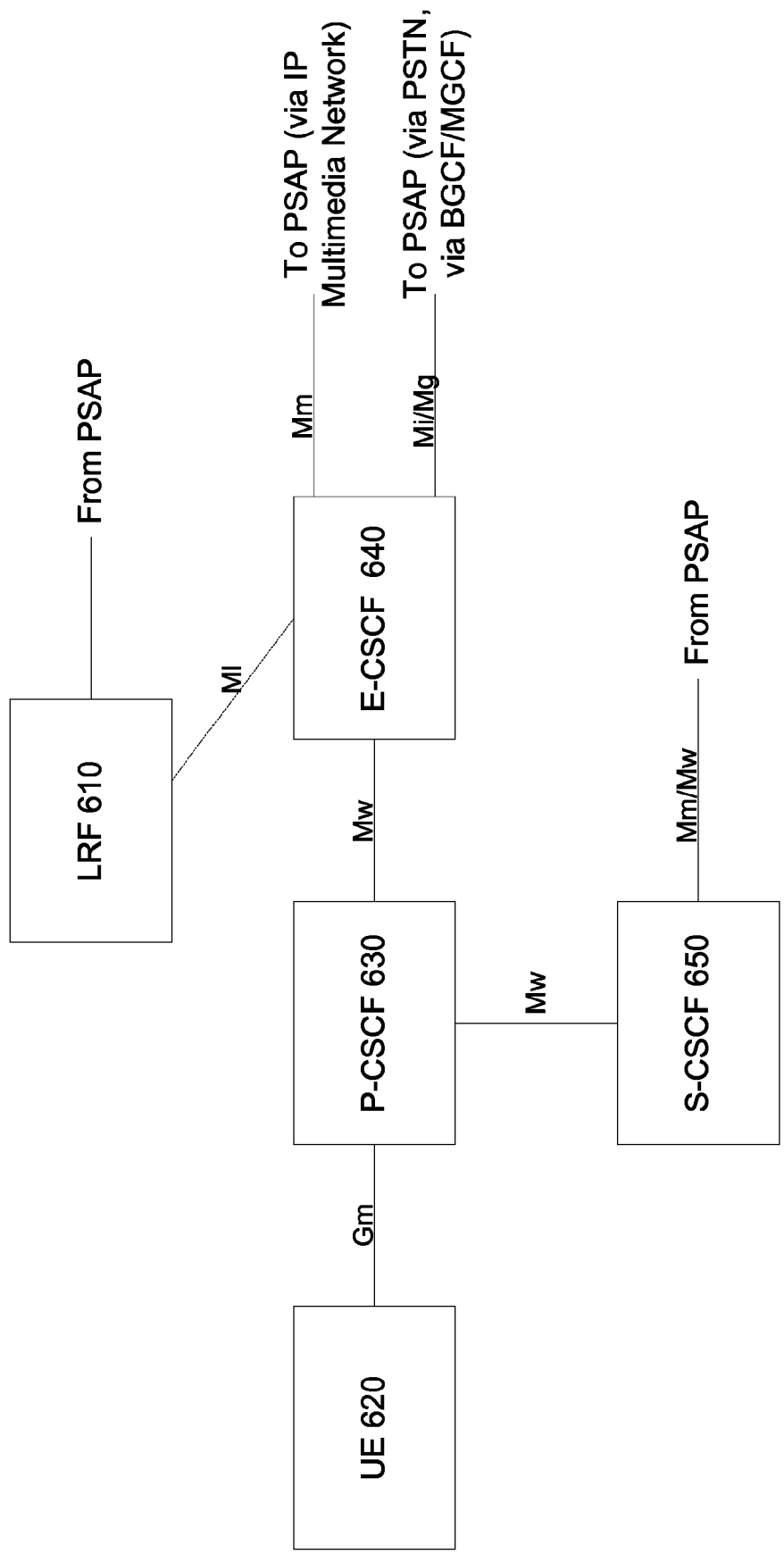
FIGS. 6A and 6B show a reference model complimentary to the models shown in FIGS. 5A and 5B respectively, but from the perspective of the services defined in 3GPP TS 23.167.

FIG. 6A shows a reference model complimentary to that in FIG. 5A, but from the perspective of the services defined in 3GPP TS 23.167. Components (including Location Retrieval Function (LRF) 610, User Equipment (UE) 620, Proxy CSCF (P-CSCF) 630, Emergency CSCF (E-CSCF) 640, and S-CSCF 650) function as defined in 3GPP TS 23.167.

Figure 6B:
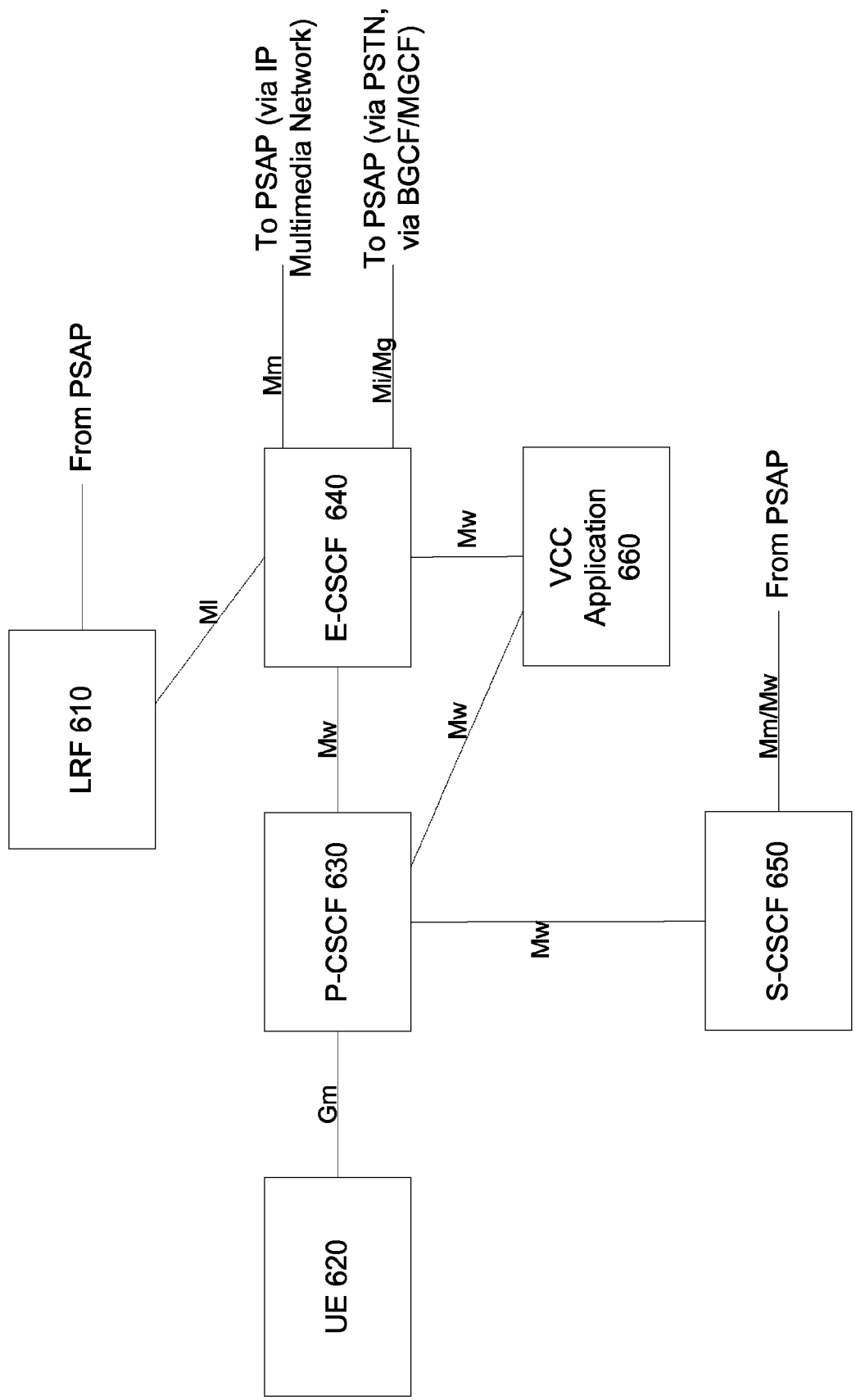

FIG. 6B includes the same reference model as FIG. 5B but shows it from the perspective of the model defined in 3GPP TS 23.167 to support IMS (VoIP) Emergency calls. In FIG. 6B, and unlike the reference model disclosed in 3GPP TS 23.167 (and shown in FIG. 6A), the VCC Application 660 has an interface to the E-CSCF 640 in the visited network and a possible interface to the P-CSCF 630 in the visited network. The emergency call will be anchored in the VCC Application as defined in 3GPP TS 23.206. In addition, location support will be anchored in an LRF 610 in the visited network such that the PSAP can continue to obtain updated location estimates from the LRF 610 regardless of how the UE 620 changes its serving network and serving domain. This LRF 610 could be referred to here as the anchor LRF.

Reference models applicable to 3GPP2 are obtained by replacing the VCC Application in FIG. 5B (as element 572) and in FIG. 6B (as element 660) with a VCC AS. In the following description applicable to 3GPP, it is to be understood (unless stated otherwise) that the same description may be used to define a method of VCC support for 3GPP2 emergency calls with certain changes of terminology and objects from a 3GPP context to a 3GPP2 context. In particular, the 3GPP VCC Application entity referred to would be replaced by a 3GPP2 VCC AS. Certain other 3GPP objects referenced below could also be replaced—e.g. a 3GPP GMLC (Gateway Mobile Location Center) would be replaced by a 3GPP2 MPC (Mobile Position Center).

III. Negotiation of VCC Support

For normal VCC, the home network (e.g., home S-CSCF) can be aware of the UE's VCC capability from subscription information obtained from the UE's home subscriber server (HSS). The UE can be already aware of the home network support of VCC and the VDN (E 164 Voice Domain Transfer Number) and VDI (Voice Domain Transfer SIP URI) used for domain transfer (or other numbers and addresses equivalent to a VDN and VDI), enabling VCC without any explicit negotiation and information transfer when a voice call is first originated.

It would be desirable to support VCC for CS and VoIP emergency calls in the same manner, although some explicit signaling changes may be needed. For example, without any negotiation of VCC support, it may be difficult to support VCC because when the UE changes domain, it will have no idea in a roaming situation whether the old and new domains can collaborate to support VCC and hence it won't know whether the existing call can be continued or not. In the following discussion, it is assumed that VCC support for IMS emergency calls is provided in the visited network.

III.A. Methods to Convey that the UE is VCC Capable

To convey to the visited network (e.g., P-CSCF, E-CSCF or Voice Mobile-Services Switching Centre (VMSC)) that the UE is VCC capable, the following alternatives are possible.

(a) If the visited network is the home network for the UE, it may discover UE VCC capability from subscription information for the UE in the home HSS.

(b) The visited network may assume that the UE is VCC capable (whether or not the UE actually is). For example, if the visited network is not the home network and thus not able to employ alternative (a), it may assume that the UE is VCC capable.

(c) The visited network (e.g. P-CSCF or VMSC) may discover UE VCC capability during registration with the home network—e.g. from the home S-CSCF in a 200 OK response to the Session Initiation Protocol (SIP) REGISTER message (defined in IETF RFC 3261) or in UE subscription information provided by an HLR/HSS to a VMSC.

(d) The UE may inform the visited network (e.g., P-CSCF or E-CSCF) of its VCC capability in one of the following ways:
  i. during registration (e.g., in the SIP REGISTER message); or
  ii. when originating an IMS emergency call (e.g. in the SIP INVITE message); or
  iii. when originating a CS mode emergency call (e.g., in the Emergency SETUP message defined in 3GPP TS 24.008).

Alternative (a) is applicable to an emergency call originated in the PS (packet switched) domain and may use the same mechanism for VCC capability discovery that is used for normal VCC support (for non-emergency calls) as described in 3GPP TS 23.206 if the UE is not roaming (i.e., is served by its home network).

With alternative (b), the visited network assumes that the UE is VCC capable and assigns VCC resources when the emergency call is originated (e.g., as described later in section IV and in FIG. 7). However, the VCC resources would only be used if the UE actually is VCC capable and the emergency call needs to transition between the IMS (VoIP) and circuit switched domains. Thus there would be some wastage of VCC resources for UEs that were not VCC capable (although the emergency call itself need not be harmed since VCC resources are only used to relay call signaling). For emergency calls originated in the PS domain the wastage may be small, because the number of such calls will generally be a very small proportion of all VoIP calls (both emergency and non-emergency). In addition, if alternative (a) is combined with alternative (b) such that the visited network assumes UE VCC capability only if it is not the home network, the level of wastage can be further reduced. However, for CS originated emergency calls, there will probably be a higher level of wastage because most CS emergency calls, at least initially, will come from legacy UEs not capable of supporting VCC.

Both alternative (a) and alternative (b) avoid impacting the UE, which is desirable to enable a common VCC solution (from the perspective of the UE) for both emergency and non-emergency calls.

Alternative (c) also avoids impacting the UE. However, alternative (c) may be restricted to authorized UEs only.

Alternative (d.i) avoids impacting the home network but is again restricted to authorized UEs only while alternatives (d.ii) and (d.iii) are valid for all UEs although they require a new variant of VCC from the UE perspective.

III. B. Methods to Convey that the Visited Network is VCC Capable

To convey to the UE that the visited network is VCC capable and transfer the VDN and the VDI if needed, the following alternatives are possible.

(e) The UE discovers visited network VCC capability (and possibly any VDN and VDI) from system broadcast messages or other messages (e.g., WLAN advertisements associated with particular visited networks) that are fixed in nature and not specific to any UE. These messages can be the same messages that are currently transmitted from all network base stations and/or access points to provide network information (e.g. network identity and supported capabilities) to all UEs.

(f) The UE discovers the visited network VCC capability and the VDN and VDI where needed using DHCP or using Hypertext Transfer Protocol (HTTP) or secure HTTP (HTTPS) from a server in the visited network whose role is to provide information related to emergency calls (e.g., including also local emergency numbers).

(g) The visited network indicates its VCC capability to the UE either:
  i. during registration (e.g., in a SIP 200 OK message); or
  ii. when replying to an IMS emergency call origination (e.g. in the SIP 200 OK message); or
  iii. when replying to a PS mode Attach request (e.g. using the Network Feature support parameter in 3GPP TS 24.008); or
  iv. when replying to a CS Emergency call origination (e.g. in a Facility parameter in a CONNECT message defined in 3GPP TS 24.008).

(h) The home network downloads information to the UE, or to the Universal Integrated Circuit Card (UICC) in the UE, concerning networks that are known to support VCC for emergency calls. For example, the home network could provide the UE with the mobile country code (MCC) and mobile network code (MNC) of all such VCC capable networks. Additional information, such as the VDNs and VDIs use by such networks, could also be provided.

Alternative (e) would be suitable for wireless networks (such as UMTS, GPRS and GSM networks) and could be possible for WLANs. It also avoids any point-to-point signaling impacts to the UE. Alternative (f), which is applicable to IMS originated calls, avoids SIP impacts and could fit in with the need to provide local emergency numbers to a UE from some server in the visited network. The address of this server could be obtained by the UE using either DHCP or a DNS query on some known Fully Qualified Domain Name (FQDN) containing the visited network's known domain name (e.g., based on the visited network's MCC and MNC) and some fixed user name—e.g. "emergency-support@<visited network domain>"). As a variant, VCC capability (and VDN and VDI addresses if needed) could be signaling directly when the UE uses DHCP to discover the P-CSCF and DNS server addresses.

Alternative (g.i) may only be valid for authorized UEs while alternatives (g.ii) (g.iii) and (g.iv) are valid for authorized and unauthorized UEs.

Alternative (h) can be valid for all UEs and may use signaling proprietary to each home network.

III.C. Required Signaling Changes

The SIP signaling changes required to support alternatives (c), (d) and (g) (described in sections III.A and III. B above) could be supported in at least four different ways.

(i) Existing SIP header fields (e.g. Record-Route, Route, Contact) are used to transfer the new signaling.

(j) The Supported SIP header field in a SIP REGISTER, SIP INVITE and SIP 200 OK is extended by creating a new option tag indicating VCC support. For transfer of additional VCC information (e.g. the VDN and VDI), a new SIP extension would be used associated with the Supported VCC option tag.

(k) The Session Description Protocol (SDP defined in IETF RFC 2327) portion of the SIP INVITE and SIP 200 OK is extended by defining new IANA registered or unregistered attributes. For example, a new property attribute could be used to indicate VCC support and one or two distinct value attributes could be assigned to convey the VDN and VDI (e.g., from the E-CSCF or VCC Application) to the UE. Media level attributes (as opposed to a session level attributes) might be more appropriate (e.g. when establishing a multi-media emergency call) to selectively define the particular media (e.g. audio only) for which VCC is supported.

(l) A combination of two or more of the alternatives (i), (j) and (k) might be used—for example conveyance of SIP capability only using a new Supported option tag as in (j) and conveyance of any further VCC information (e.g. VDN and VDI) using new SDP level value attributes as in (k).

As one example of alternative (j), the UE could indicate its support of VCC in the SIP REGISTER message by including the Supported SIP header field containing a new option tag indicating VCC support. The 200 OK returned by the visited network P-CSCF could then include the same option tag if the visited network supports VCC plus the VDN and VDI (if needed) in a new SIP extension. As another example, the same exchange could occur during call establishment in the SIP INVITE and 200 OK. The same examples apply to alternatives (k) and (l) but with the VCC indication and/or VCC related information conveyed using new SDP attributes.

In order to avoid SIP and other point-to-point signaling impacts between the UE and visited network on the air interface, some combination of alternatives (a), (b), (c), (e), (f) and (h) can be used. However, allowing SIP and CS domain signaling impacts for the UE can avoid impacts to the home network and support VCC for unauthorized UEs—e.g. using alternatives (d.ii) (d.iii), (g.ii), (g.iii) and (g.iv).

IV. IMS Emergency Call Origination

Emergency call origination could occur as defined in 3GPP TS 23.167 but with some changes to negotiate usage of VCC. In particular, in order to preserve continuity of location support as well as continuity of the voice call following any domain transfer, either the E-CSCF or P-CSCF in the visited network would need to send the SIP INVITE (for the IMS emergency call) to the before invoking the LRF to obtain or verify location and select the destination PSAP. The VCC Application would then anchor the incoming call leg and originate a new outgoing call leg through the E-CSCF towards the PSAP. The E-CSCF is thus invoked on the outgoing call leg from the VCC Application. On receiving the SIP INVITE from the VCC Application, the E-CSCF would perform normal location and routing as defined in TS 23.167 and transfer the call to the PSAP either via IP or through a Media Gateway Control Function (MGCF) and the Public Switched Telephone Network (PSTN). Performing location and routing as part of the outgoing call leg from the VCC Application is essential in order that the association with the anchor Location Retrieval Function (LRF) remain preserved throughout the duration of the call. The continued association with the anchor LRF will enable continuity of location support. In particular, when the call is finally released, the E-CSCF will still be on the call signaling path regardless of the number of preceding domain transfers and will thus be able to inform the LRF that the call was released, thereby enabling the LRF to release its record of the call in compliance with requirements in 3GPP TS 23.167.

Figure 7:
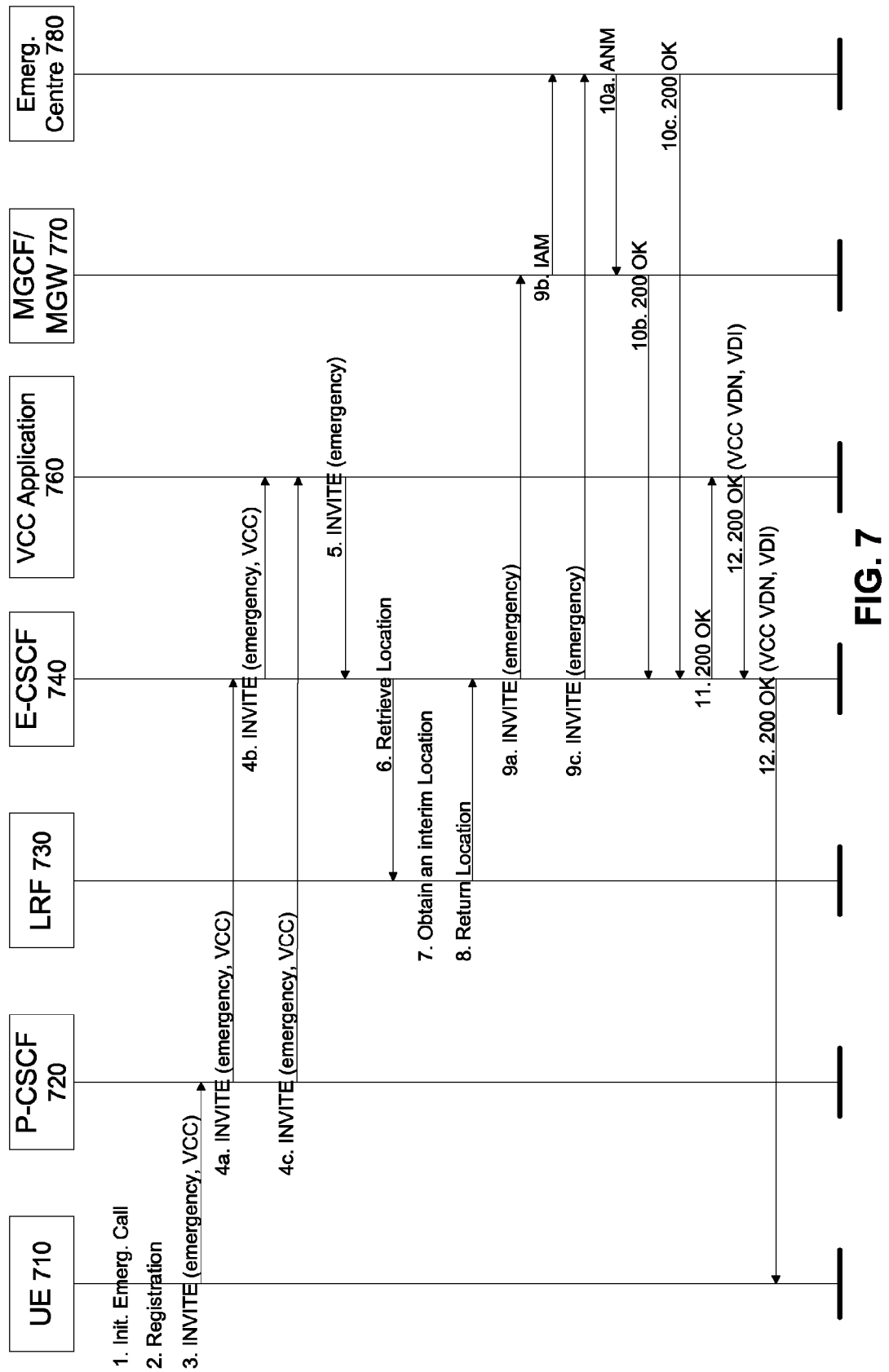
FIG. 7 illustrates an exemplary call origination procedure.

FIG. 7 illustrates an exemplary ensuing call origination procedure and includes, as possible options, several of the alternatives already described for negotiating usage of VCC and transferring any VCC related information.

Step 1 (Initiates emergency call). In this step, the user initiates an emergency call.

Step 2 (Registration). The user equipment (UE) 710 may perform an emergency registration procedure with the visited network P-CSCF 720 and home network S-CSCF (not shown) as described in 3GPP TS 23.167 if it contains the credentials. The SIP REGISTER message sent by the UE 710 or the SIP 200 OK message returned by the home S-CSCF may indicate to the visited network P-CSCF 720 that the UE 710 is VCC capable. The 200 OK returned to the UE 710 by the visited network P-CSCF 720 may also indicate that the visited network is VCC capable and may provide a VDN and VDI (if needed).

Step 3 (INVITE(emergency, VCC)). The user equipment (UE) 710 sends an INVITE with an emergency indication to the visited network P-CSCF 720. The INVITE may contain any location objects that the UE 710 has. The location object is dependant upon the access network technology. The INVITE may also indicate UE support for VCC if this was not conveyed to the visited network in step 2 and may also contain identification information for the UE—e.g. a SIP and Telephone call back address or number.

Steps 4a, 4b, and 4c. Based on any indication of VCC support in the INVITE or on knowledge of VCC support obtained in step 2 or on knowledge or assumption of VCC support according to alternatives (a) and/or (b) (described in section III.A above), the P-CSCF 720 may forward the INVITE in two different ways:

i. Step 4a (INVITE(emergency, VCC)). The P-CSCF forwards the SIP INVITE to an E-CSCF 740 together possibly with an indication of VCC support; and in step 4b (INVITE(emergency, VCC)), the E-CSCF 740, based on the indication of VCC support in step 4a or due to network policy (e.g. assumption of VCC support by all UEs), forwards the SIP INVITE to a VCC Application 760; or ii. Step 4c (INVITE(emergency, VCC)). Alternatively, the P-CSCF forwards the SIP INVITE directly to the VCC Application.

Step 5 (INVITE(emergency)). The VCC Application 760 anchors the incoming call leg and originates an outgoing leg by sending the INVITE to (or back to) the E-CSCF 740. The INVITE still carries an emergency indication but no longer indicates support for VCC.

Step 6 (Retrieve location). The E-CSCF 740 performs normal treatment for emergency call setup as defined in 3GPP TS 23.167. If the location object provided in the INVITE is insufficient to determine the correct PSAP or if the IMS core requires the assistance of a Routing Determination Function (RDF), of if the IMS core is required to verify the location object, a retrieve location request is sent to the LRF 730 to perform the location retrieval functionality. The retrieve location request may include information identifying the UE 710 (e.g. MSISDN, IMSI and/or IMEI) and the IP Connectivity Access Network (IP-CAN) and may include means to access the UE (e.g. UE IP address). The retrieve location request may also include any location objects provided in the INVITE in step 3. The retrieve location request may further include an indication of VCC support and identification information for the VCC Application 760 (e.g. the VDN and VDI). However, this may only be needed for procedures C and D described later in sections VI.B.1 and VI.B.2.

Step 7 (Obtain an Interim Location). The LRF 730 may obtain an interim location estimate. The means to obtain the interim location estimate is dependant upon the access technology the UE 710 is using to access the IMS and may include using the PS-NI-LR or PS-MT-LR procedures defined in 3GPP TS 23.271 or the Secure User Plane Location (SUPL) procedures defined in OMA AD SUPL: "Secure User Plane Location Architecture", OMA TS ULP: "User Plane Location Protocol", or other procedures. The LRF 730 may invoke a Routing Determination Function (RDF) to convert the interim location or any location object received in step 6 into the address of a PSAP. The LRF may record the information received in step 6.

Step 8 (Return location). The location information and/or the PSAP address (obtained in step 7) are returned to the E-CSCF 740. The LRF 730 may also return correlation information (e.g. ESQK) identifying itself and any record stored in step 7. For the remainder of the call, the LRF 730 serves as the anchor LRF.

Steps 9a, 9b, and 9c. The E-CSCF 740 uses the PSAP address provided in step 8 or selects an emergency centre or PSAP itself possibly based on location information provided in step 8 and sends the request including the location information and any correlation information to the emergency centre or PSAP 780.

- Step 9a (INVITE(emergency)). The INVITE is sent to an MGCF/MGW (Media Gateway Control Function/Media Gateway) 770; and in step 9b (IAM), the SS7 ISUP IAM is continued towards the emergency centre or PSAP; or
- Step 9c (INVITE(emergency)). The INVITE is sent directly to the emergency centre or PSAP 780.

Steps 10a, 10b, and 10c. Intermediate signaling for call establishment may occur (e.g., return of an SS7 ISUP ACM from a PSTN capable PSAP) which is not shown. When the PSAP answers the call, the following steps occur:

- Step 10a (ANM). The PSAP 780 returns an SS7 ISUP ANM to the MGCF/MGW 770; and in step 10b (200 OK), the MGCF/MGW returns a 200 OK to the E-CSCF; or
- Step 10c (200 OK). The PSAP 780 returns a 200 OK directly to the E-CSCF 760.

Step 11 (200 OK). The E-CSCF 740 returns the 200 OK to the VCC Application (on the outgoing call leg started in step 5) 760.

Step 12 (200 OK). The VCC Application 760 returns a 200 OK to either the E-CSCF (on the incoming call leg used in step 4) 740 or the P-CSCF 720 (not shown in FIG. 7) if step 4c was used earlier. If the UE 710 did not discover visited network support for VCC and any associated VCC information (e.g., VDN, VDI) in step 2 or prior to step 2, the 200 OK returned by the VCC Application 760 may indicate support for VCC and may include a VDN and/or VDI.

Step 13 (200 OK). The E-CSCF 740 or P-CSCF 720 returns the 200 OK to the UE 710 (e.g., via the P-CSCF 720 if from the E-CSCF). To reduce impacts to the VCC Application 760, any VCC indication and VDN/VDI could be placed in the 200 OK by the E-CSCF 740 or by the P-CSCF 720 and not by the VCC Application 760 in step 12. The UE 710 then stores any received VDN and/or VDI.

After the emergency call has been established between UE 710 and Emergency Centre 780 in FIG. 7, the Emergency Centre may request a more accurate location from LRF 730 using the procedure already defined in 3GPP TS 23.167 and TS 23.271.

V. CS Emergency Call Origination

Figure 8:
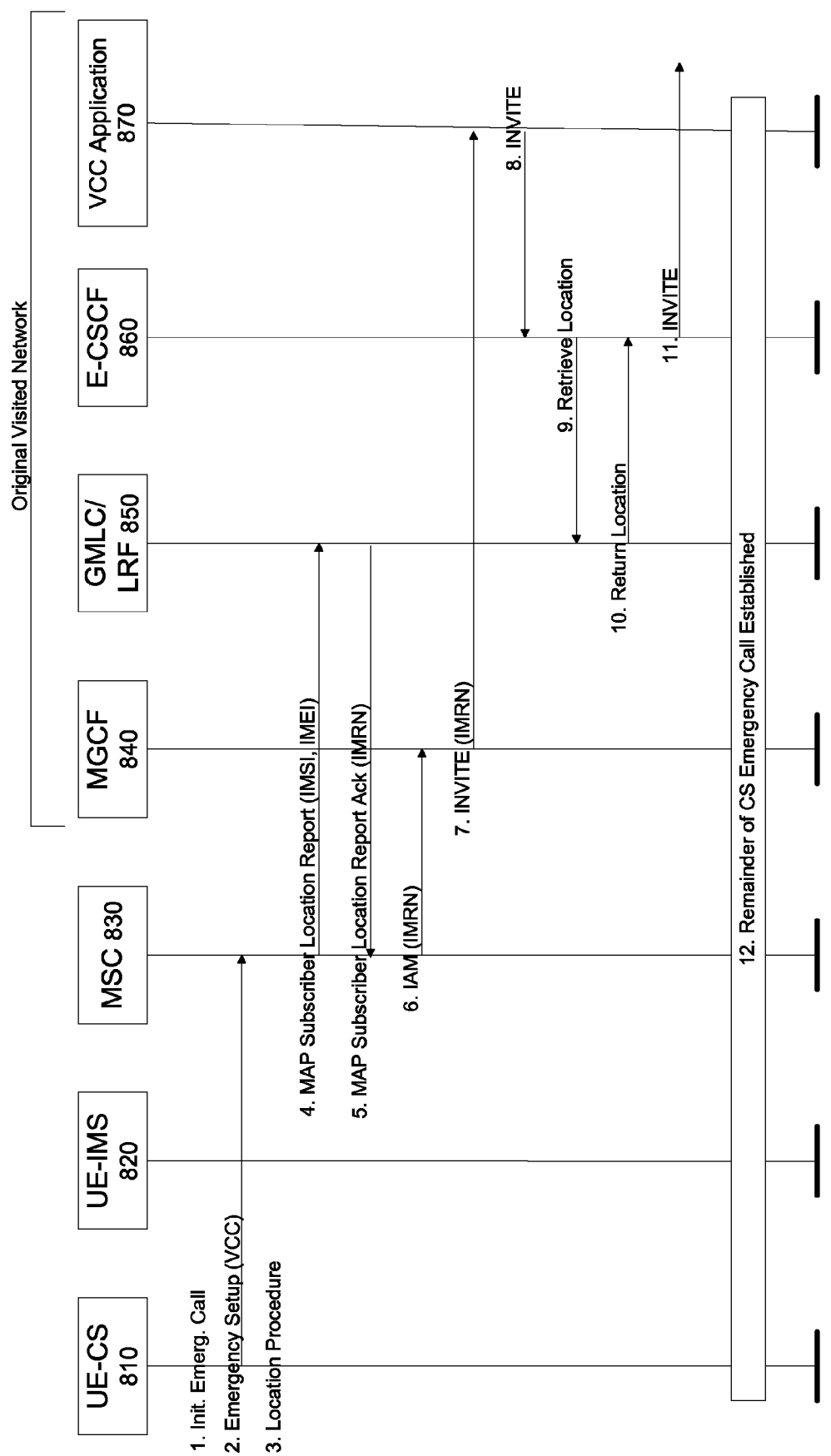
FIG. 8 illustrates an exemplary solution to support VCC calls originated in the CS (circuit switched) domain.

An exemplary solution to support VCC calls originated in the CS (circuit switched) domain is illustrated in FIG. 8. In this case, the E-CSCF is also invoked from the VCC Application on the outgoing call leg and, in addition, an existing GMLC MAP query can be used by the MSC on the incoming call leg to the VCC Application to correctly route the incoming call leg to the VCC Application as described below. In this example, the GMLC uses an IP Multimedia Routing Number (IMRN) to route the incoming call leg to the VCC Application. The GMLC query and IMRN use may be partly or completely transparent to the MSC as shown below.

Step 1 (Initiates emergency call). In this step, the user initiates an emergency call.

Step 2 (Emergency setup). The UE 810 originates an emergency voice call in the CS domain by sending an Emergency Setup message to the VMSC 830 (as defined in 3GPP TS 24.008). The Setup message may indicate that the UE supports VCC.

Step 3 (Location procedure). The VMSC 830 may initiate a procedure in the RAN to obtain an interim location estimate for the UE 810 as defined and allowed in 3GPP TS 23.271.

Step 4 (MAP subscriber location report). Based on local VMSC 830 policy or based on subscription information obtained from the UE's home HLR/HSS or based on any VCC indication received in step 2, the VMSC 830 sends a MAP Subscriber Location Report to a GMLC 850 associated with the emergency service provider (PSAP) to which the call would normally be sent (e.g., based on the serving cell ID and dialed emergency number). The MAP Subscriber Location Report carries the IMSI, MSISDN, IMEI, VMSC address and serving cell identity or SAI for the UE. It also includes any interim location estimate obtained in step 3. In regions (e.g., the European Union) where the VMSC 830 and not the GMLC 850 normally determines the PSAP, the message may carry the address of the intended destination PSAP. If the MS provided an indication of VCC support in step 2, the MAP Subscriber Location Report may also carry such an indication.

Step 5 (MAP subscriber location report ACK). The GMLC 850 assumes the UE 810 supports VCC or determines this from subscription information if the UE 810 is served by the home network or the GMLC 850 determines this from any VCC indication provided in step 4. The GMLC 850 stores a call record for the UE 810 including all the information received in step 4. The GMLC 850 assigns an IP Multimedia Routing Number (IMRN) to the call. The IMRN may be an international ITU E.164 ISDN/telephone number, a national ISDN/telephone number or some other number or combination of numbers or parameters (e.g., composed of a sequence or several sequences of decimal digits). The IMRN may also be referred to by other names—for example as a routing number. Minimally, the IMRN enables call routing to the VCC Application 870 in steps 6 and 7 and identifies the GMLC. Optionally, the IMRN may also temporarily identify the call record stored in the GMLC and/or may indicate the PSAP. The GMLC returns a MAP Subscriber Location Report ACK to the VMSC 830 carrying the IMRN in the NA-ESRD or NA-ESRK parameter or in some other parameter or set of parameters. The GMLC 850 may also instigate a CS-MT-LR (not shown in FIG. 4) with the VMSC 830 to obtain an interim location estimate for routing or an accurate location estimate for later provision to the PSAP. If an interim location estimate is obtained in this step rather than in step 3, it will be possible to re-use the procedure of FIG. 8 to support IMS to CS domain transfer as described further in section VI.

Step 6 (IAM). The VMSC 830 routes the call based on the IMRN received in step 5. If the IMRN is conveyed using the existing NA-ESRK or NA-ESRD parameter then the call routing procedure in the VMSC 830 can be the same as that used for normal emergency call origination in 3GPP TS 23.271. Based on IMRN routing, the VMSC 830 routes the call to an MGCF 840 in the visited network.

Step 7 (INVITE(MRN)). The MGCF 840 initiates an INVITE towards an I-CSCF (not shown in FIG. 8) in the visited IMS or possibly the MGCF 840 routes directly to the E-CSCF 860, an S-CSCF (not shown in FIG. 8) or VCC Application 870. The INVITE contains the identity (e.g., MSISDN Tel URI as Contact address) of the UE 810. The I-CSCF or S-CSCF (not shown) or E-CSCF 860, based on the IMRN, instigates PSI based application server termination to the VCC Application 870.

Step 8 (INVITE). The VCC Application 870 anchors the incoming call leg and originates an outgoing leg by sending the INVITE to (or back to) the E-CSCF 860. The INVITE carries information (e.g., in the SIP INVITE TO header) identifying an emergency call and enabling recovery of the IMRN (e.g., unique digits in the IMRN may be included and known fixed digits may be excluded). Location information (e.g., a pidf-lo) need not be included.

Step 9 (Retrieve location). Based, for example, on inclusion of IMRN information in step 8, the E-CSCF 860 may send a retrieve location request to an LRF 850 identified by or associated with the IMRN. The retrieve location request includes IMRN information and any UE identification (e.g., an MSISDN Tel URI) received in step 8. The retrieve location request may further include an indication of VCC support and identification information for the VCC Application—e.g., the VDN and VDI. However, this may only be needed for procedures C and D described later in sections VI.B.1 and VI.B.2.

Step 10 (Return location). Based on any UE identification received in step 9 (e.g., MSISDN) and/or on IMRN information, the LRF 850 interacts with the GMLC 850 and retrieves the call record stored by the GMLC 850 in step 5. Using any interim location information already in the call record, or any interim location obtained according to step 5 (once this has completed), or the identity of the intended PSAP destination, the LRF 850 returns a PSAP address and possibly location information to the E-CSCF 860. If the LRF and GMLC are distinct, the LRF will provide the anchor point for further support of location and may copy the call record obtained from the GMLC as well as storing information received from the E-CSCF in step 9. The LRF may return correlation information (e.g., ESQK) to the E-CSCF 860 identifying itself and the call record. The LRF may further interact with the GMLC to instigate a CS-MT-LR procedure with the VMSC 830 (as defined in 3GPP TS 23.271) to obtain an accurate location estimate for the UE. If the IMRN provided by GMLC 850 in step 5 indicates the PSAP and if the LRF and GMLC are tightly associated (e.g., parts of the same entity), steps 9 and 10 may not be executed and the E-CSCF may use the IMRN to obtain the PSAP address.

Step 11 (INVITE). The E-CSCF 860 uses the PSAP address obtained in step 10 and sends on the call request including any location information and any correlation information (e.g., the ESQK or IMRN) to the emergency centre or PSAP. The call request is either sent via MGCF/MGW 840 into the PSTN (not shown) or is sent directly as a SIP INVITE towards an IP capable emergency centre or PSAP.

Step 12 (Establish remainder of CS emergency call). The rest of the call establishment procedure occurs between the UE 810, VMSC 830, MGCF 840, VCC Application 870, E-CSCF 860, and PSAP based on the VCC CS origination procedure described in 3GPP TS 23.206.

In step 2 of FIG. 8, any VCC indication might be included in the Emergency Category parameter in the Emergency Setup message (defined in 3GPP TS 24.008) as a new service category (since there are currently 3 spare bits allowing up to 3 new service categories to be defined). This may be workable if during the remaining expected lifetime of CS mode, no new emergency categories are expected.

After the emergency call has been established between UE 810 and the PSAP in FIG. 8, the PSAP may request a more accurate location from LRF 850 using the procedure already defined in 3GPP TS 23.167 and TS 23.271. In particular, the PSAP can use any correlation information received from E-CSCF 860 in step 11 of FIG. 8, such as the ESQK or IMRN, to identify LRF 850. If steps 9 and 10 had not been executed, LRF 850 would then need to interact with GMLC 850, as described for step 10 in FIG. 8, in order to retrieve the record for the UE established in GMLC 850 in step 5 of FIG. 8.

The above procedure preserves support for existing PSAP routing options (e.g. using cell ID or an interim location estimate), may not require any new impacts to MSCs and supports accurate location retrieval by the PSAP in the manner currently defined in 3GPP TS 23.167 and TS 23.271. It also enables CS originated emergency calls to be sent to IP capable PSAPs.

In the case of 3GPP2, FIG. 8 is also applicable to describe CS emergency call origination except that in addition to replacing the VCC Application by a 3GPP2 analogous entity, the 3GPP MAP messages shown in steps 4 and 5 would also be replaced by analogous 3GPP2 messages. In this case, the 3GPP2 messages in step 4 and 5 would be the 3GPP2 MAP Origination Request and MAP Origination Request Ack, respectively; the MSISDN in step 4 would be replaced by the Mobile Identification Number (MIN) or Mobile Directory Number (MDN) and the GMLC in FIG. 8 would be replaced by the 3GPP2 Mobile Position Center (MPC).

VI. Domain Transfer

Figure 9A:
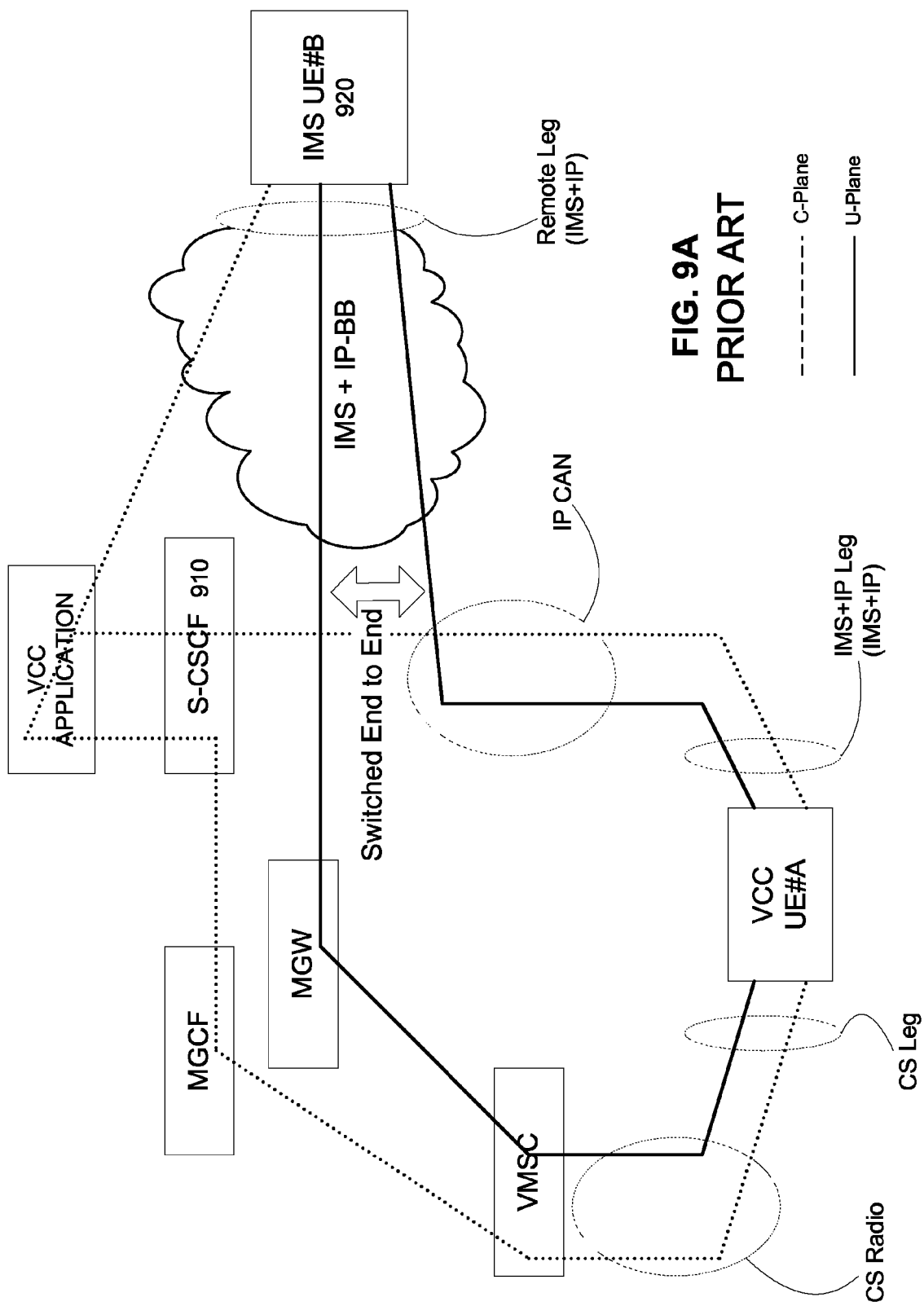
FIGS. 9A and 9B show an exemplary model of switching the user plane (as disclosed in 3GPP TS 23.206)
Figure 9B:
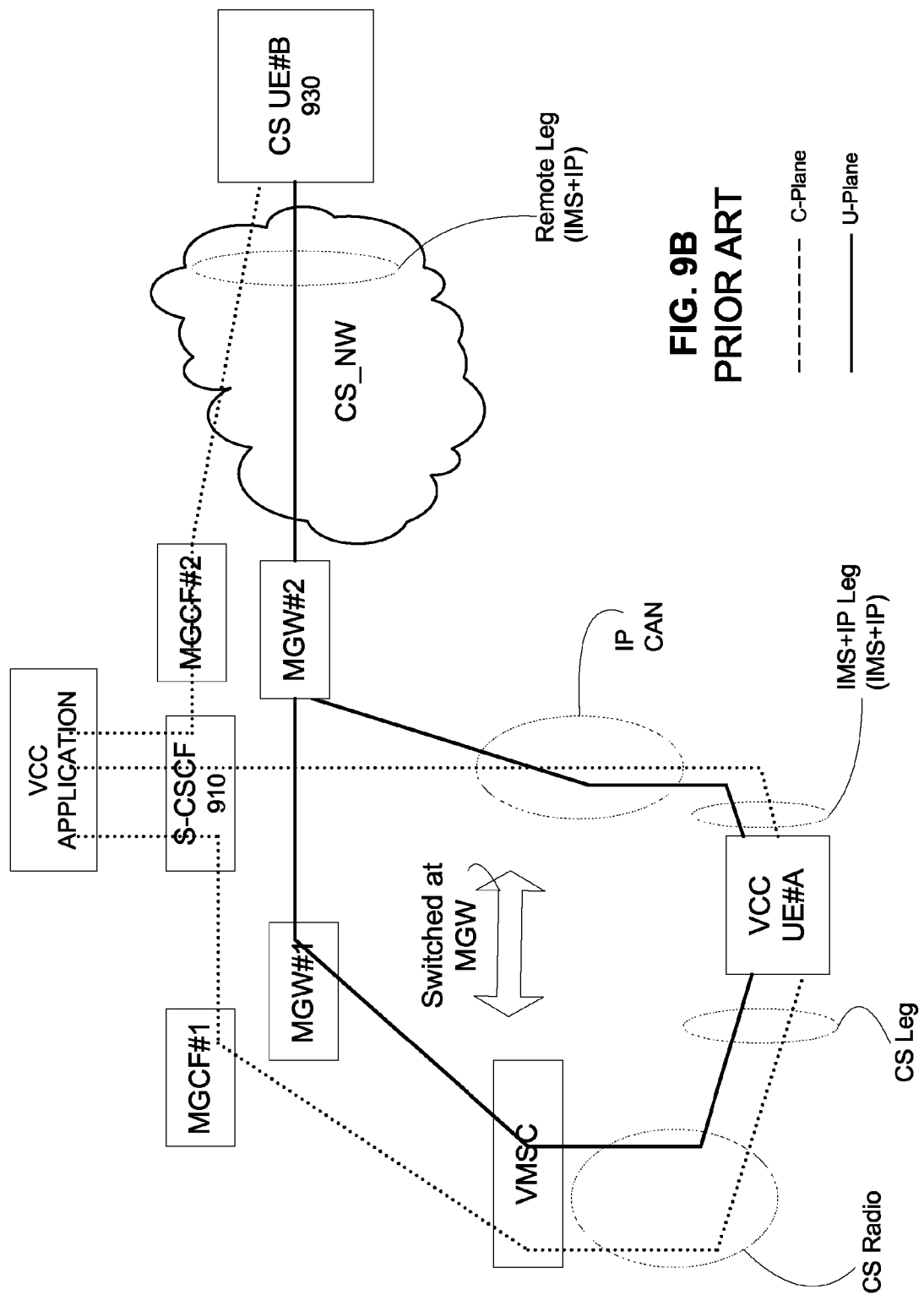

Domain transfer can occur in a very similar manner to that for normal VCC as defined in 3GPP TS 23.206. FIGS. 9A and 9B are based on figures in 3GPP TS 23.206 showing switching of the user plane. For support of VCC for IMS emergency calls, the S-CSCF 910 shown in FIGS. 9A and 9B would be replaced by the E-CSCF 1050 (in the visited network; shown in FIGS. 10A and 10B) and the UE#B 920 and 930 (as shown in FIGS. 9A and 9B respectively) would correspond to the PSAP 1060 (shown in FIGS. 10A and 10B).

VI.A. Domain Transfer IMS to CS

Two alternative procedures are described here to support domain transfer for an IMS emergency call from the IMS domain to the CS domain when the UE moves out of IMS coverage and into CS coverage. In procedure A described in this section, the VCC capable UE behaves as for normal VCC (described in 3GPP TS 23.206) and originates a new call leg in the CS domain to the VCC Application using the VDN obtained from the visited or home network using any of alternatives (e), (f), (g) or (h) described in section III.B above.

VI.A.1. Domain Transfer IMS to CS—Procedure A

Figure 11:
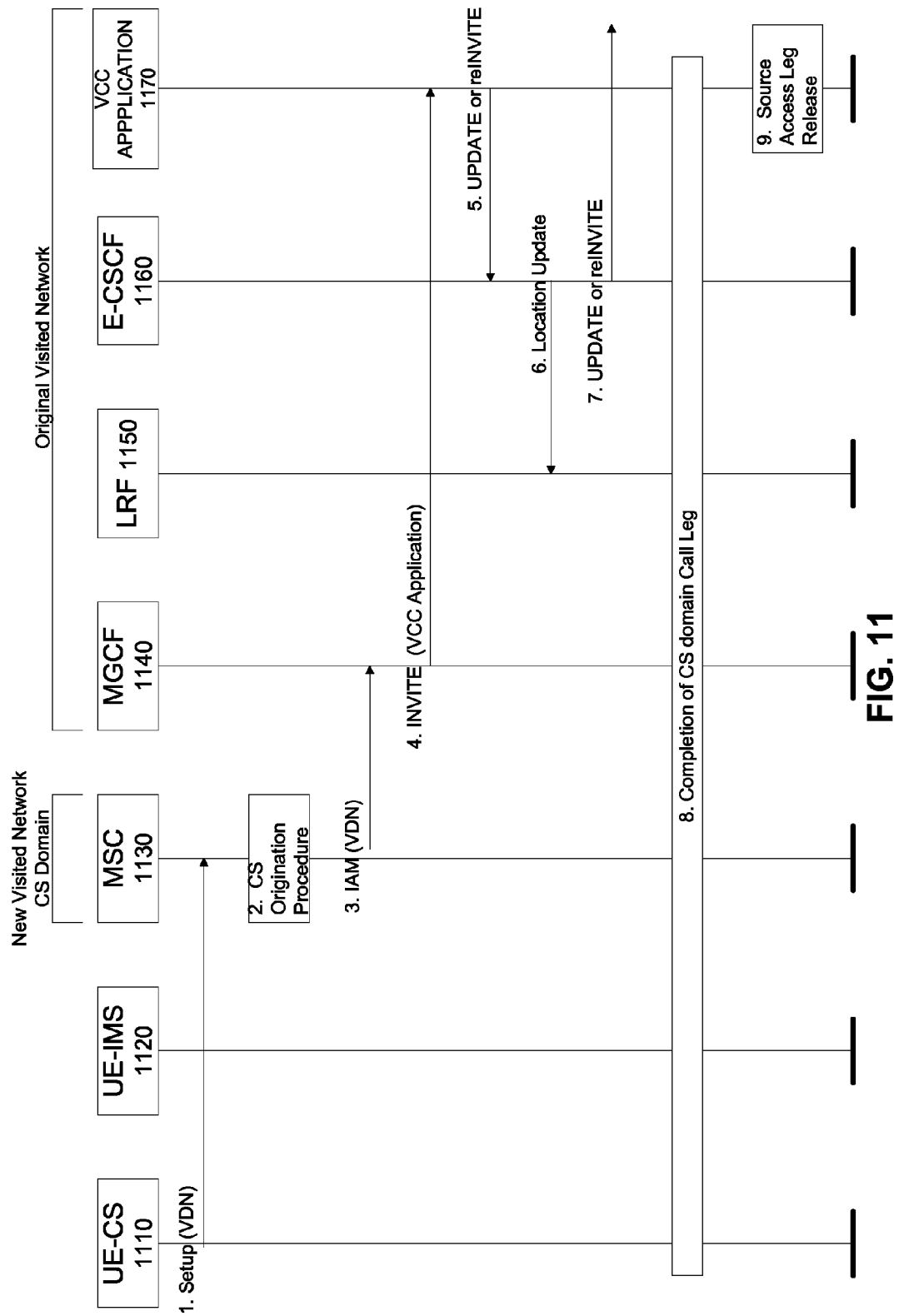
FIG. 11 illustrates an exemplary implementation of domain transfer from IMS to CS.

In one embodiment, procedure A is applicable to a UE 1110 that has sufficient credentials to register in the new visited network supporting the CS domain and places limitations on the continuity of support for providing further UE location updates to the PSAP. However, the procedure has the advantage of being compatible from the UE perspective with IMS to CS domain transfer for normal VCC. FIG. 11 illustrates an exemplary implementation of procedure A.

Step 1 (Setup (VDN). If the user is not attached to the CS domain at the time when the UE determines a need for Domain Transfer to CS, the UE performs a CS Attach including a location update to its HLR/HSS. It subsequently originates a voice call in the CS domain using the VDN obtained earlier from the original visited network or home network to establish an Access Leg via the CS domain. It is assumed for this procedure that the UE can be authenticated in the CS domain.

Step 2 (CS origination procedure). The originating call is processed as for normal CS call originations in the CS network.

Step 3 (IAM (VDN)). The visited Mobile Switching Center (VMSC) 1130 routes the call towards the original visited IMS network via an MGCF 1140 in the original visited network.

Step 4 (INVITE (VCC Application). The MGCF 1140 initiates an INVITE towards an Interrogating CSCF (I-CSCF; not shown in FIG. 11) in the original visited IMS or possibly the MGCF routes directly to the E-CSCF 1160, an S-CSCF or VCC Application 1170. The I-CSCF or S-CSCF (not shown) or E-CSCF 1160, based on the VDN, instigates PSI based application server termination to the VCC Application 1170.

Step 5 (UPDATE or reINVITE). The VCC Application 1170 updates the outgoing Access Leg by communicating the SDP of the Access Leg established in the transferring-in domain to the remote end via the E-CSCF 1160. Access Leg update happens according to SIP session modification procedures in IETF RFC 3261. The VCC Application 1170 may also explicitly indicate domain transfer to the E-CSCF 1160.

Step 6 (Location update). The E-CSCF 1160 sends a Location Update to the anchor LRF 1150 with the new SDP information. At a minimum, the E-CSCF 1160 indicates to the LRF 1150 that there has been a CS domain transfer (e.g. this can be known by the VCC Application 1170 from use of a VDN rather than VDI and/or from domain transfer involving an MGCF 1140).

Figure 10A:
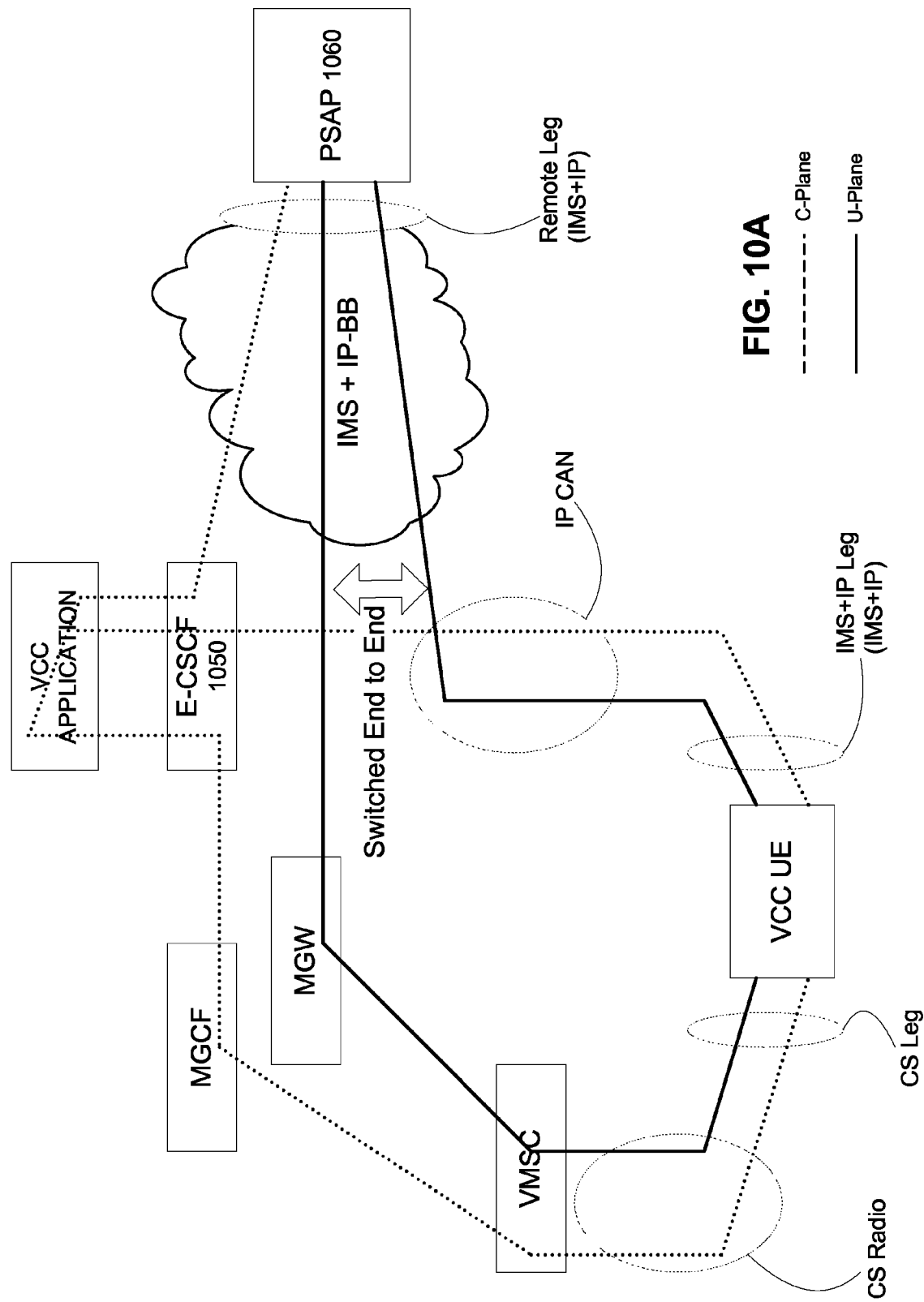
FIGS. 10A and 10B illustrate a modified model of switching the user plane that is in accordance with the invention, and that is different from the standard model (as disclosed in 3GPP TS 23.206 and shown in FIGS. 9A and 9B)
Figure 10B:
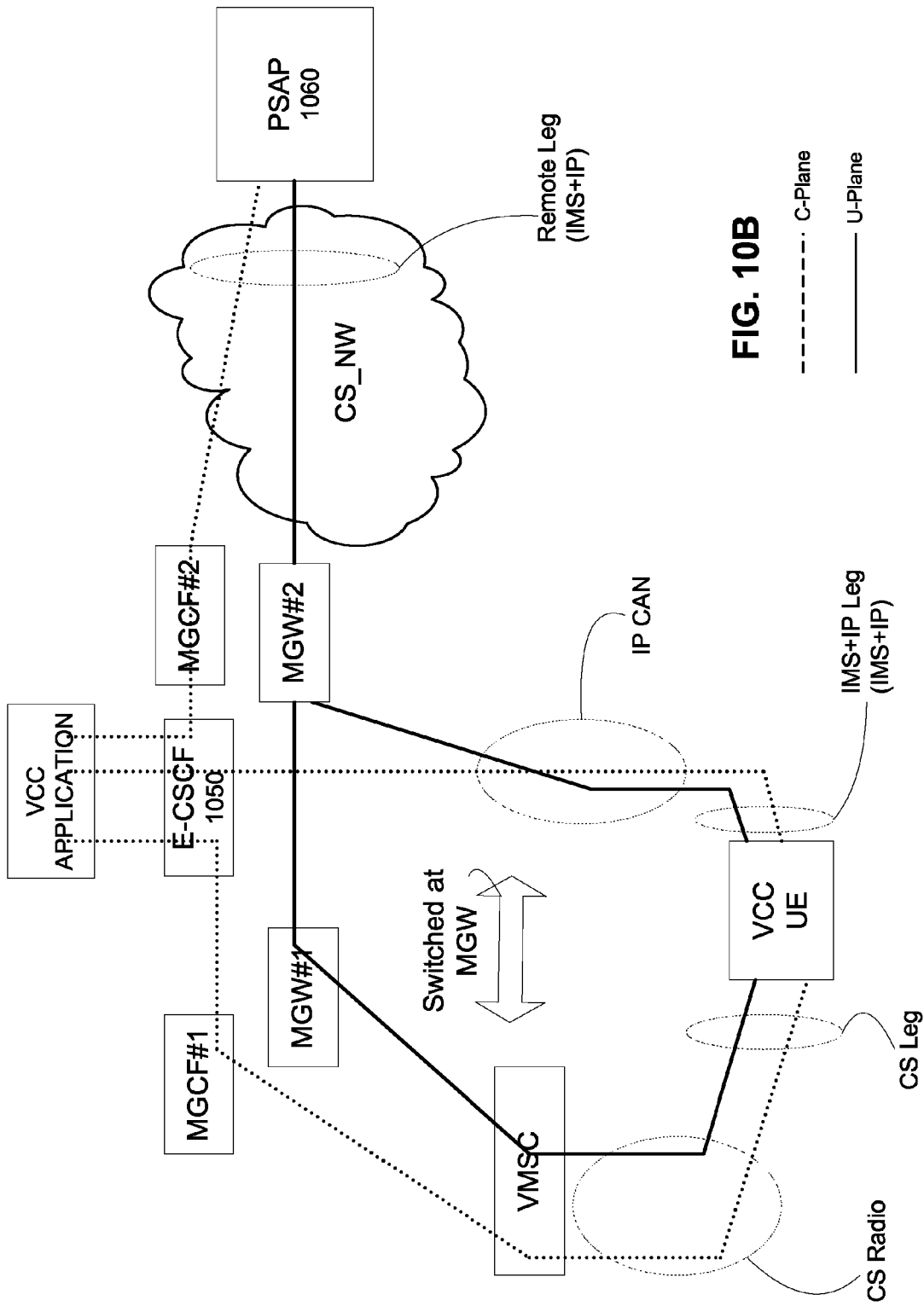

Step 7 (UPDATE or reINVITE). The update continues towards the PSAP if the PSAP is IP capable (as illustrated in FIG. 10A) or towards the MGCF if the PSAP is only CS capable (as illustrated in FIG. 10B).

Step 8 (Completion of CS domain call leg). The new call leg in the transferring-in CS domain is established between the VCC Application 1170, E-CSCF 1160 or S-CSCF if present, I-CSCF if present, MGCF 1140, VMSC 1130 and UE 1110.

Step 9 (Source access leg release). The previous incoming Access Leg which is the Access leg previously established over IMS is released. The UE 1110 should de-register if possible in the visited network P-CSCF and home network S-CSCF.

In one embodiment, continuing support of location after procedure A has transferred the UE to the CS domain may be restricted as follows. If the PSAP sends a request to the anchor LRF to obtain the location of the UE, it may not be possible for the LRF to continue using the same procedure to obtain location as it may have been using (or expecting to use) while the UE was in the IMS domain. For example, if the LRF was using OMA SUPL based on UDP/IP, TCP/IP and/or SIP transport between the LRF and UE, the loss of access to the PS domain by the UE following IMS to CS domain transfer may prevent further use of SUPL. In addition, the LRF may not be able to use the control plane location solutions defined in 3GPP TS 23.271 for CS emergency calls (e.g., in clause 9.1.3 of 3GPP TS 23.271) because it may not know the VMSC address. However, the LRF could use the more general CS-MT-LR procedure described in clauses 9.1.1 and 9.1.2 of 3GPP TS 23.271 in which the LRF, behaving as or accessing a Gateway Mobile Location Center (GMLC), obtains the VMSC address by querying the UE's home HLR/HSS. A disadvantage of this, however, is that the UE's HLR/HSS will need to support the CS-MT-LR query procedure and there may be billing issues between the visited network and home network (since the home network may not be aware of the emergency call significance).

VI.A.2. Domain Transfer IMS to CS—Procedure B

Figure 12:
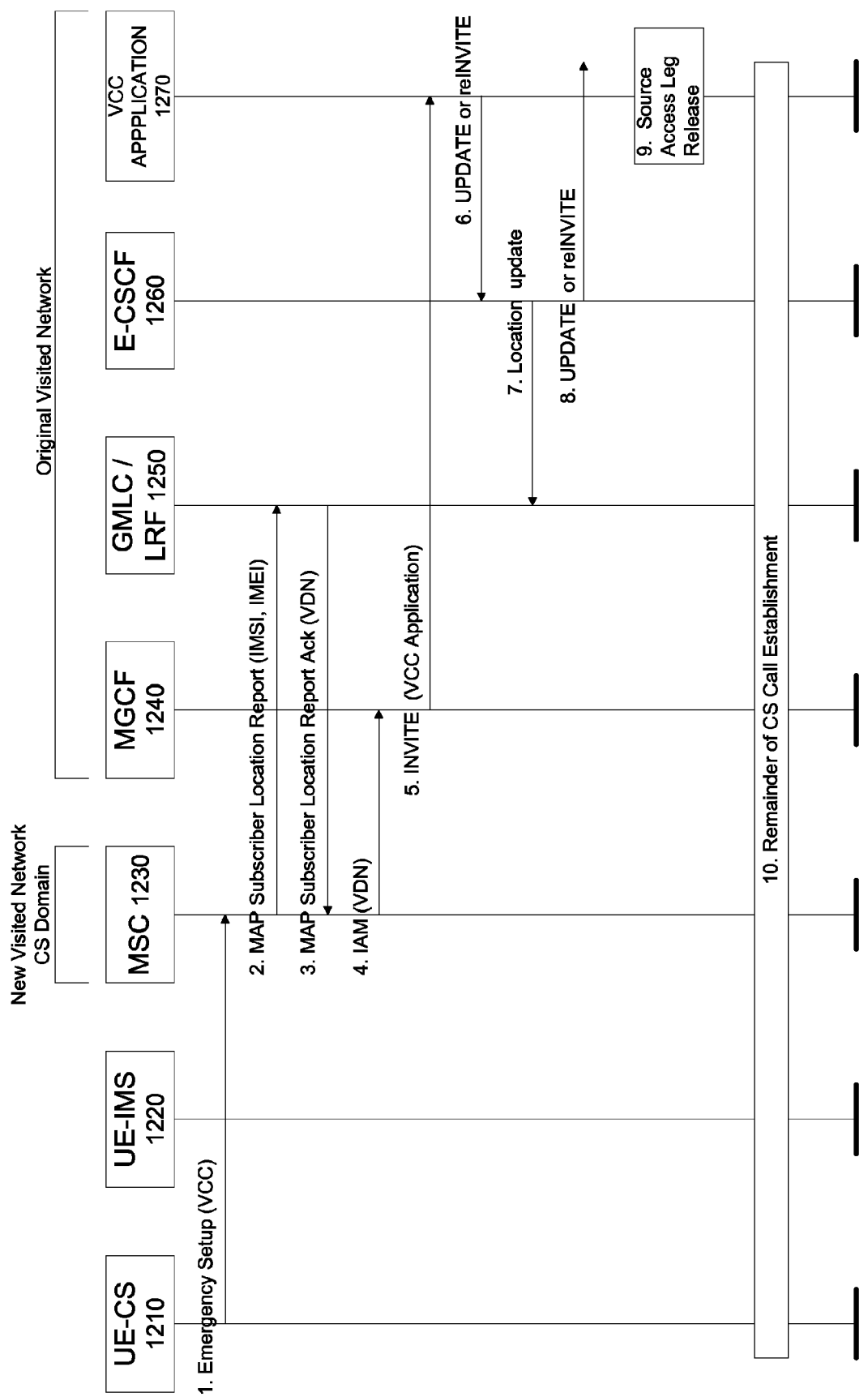
FIG. 12 illustrates an exemplary alternative implementation of domain transfer IMS to CS.

In an alternative embodiment, procedure B, which enables IMS to CS domain transfer, would be applicable to a UE whether or not it has sufficient credentials to register in the new visited network and enables continuity of location support without limitation. However, in one embodiment, this procedure may be restricted to domain transfer between networks belonging to the same operator. Furthermore, procedure B requires a new variant of VCC domain transfer in the UE in which knowledge of a VDN is not needed. FIG. 12 illustrates an exemplary implementation of procedure B.

Step 1 (Emergency SETUP(VCC)). If the user is not attached to the CS domain at the time when the UE determines a need for Domain Transfer to CS, the UE 1210 may perform a CS Attach if it contains the credentials. It subsequently originates an emergency voice call in the CS domain by sending an Emergency Setup message to the VMSC 1230 (as defined in 3GPP TS 24.008). The Emergency Setup message may contain an indication of VCC support. However, no VDN needs to be included.

Step 2 (MAP subscriber location(IMSI, IMEI)). Based on local VMSC policy or based on subscription information obtained from the UE's home HLR/HSS or based on any VCC indication received in step 1, the VMSC 1230 sends a MAP Subscriber Location Report to a GMLC 1250 associated with the emergency service provider (PSAP) to which the call would normally be sent. The MAP Subscriber Location Report carries the same information as that which would be sent for a normal emergency call origination (e.g. step 4 in FIG. 8) including the IMSI, MSISDN, IMEI, VMSC address and serving cell identity or SAI. In one embodiment, no location estimate is included but an indication of VCC use may be included.

Step 3 (MAP subscriber location ACK (VDN)). Based on local policy or due to receipt of a VCC indication in step 2, the GMLC interacts with an associated LRF (e.g., a logical LRF within the same physical entity as the GMLC) or a set of associated LRFs to search for the call record for the UE 1210 that was originally established in the anchor LRF 1250 (e.g., using the procedure described in FIG. 7 or FIG.

8). The anchor LRF 1250 may use the IMSI, MSISDN and/or IMEI received in step 2 to identify the correct call record. If no call record is found and the UE did not indicate VCC domain transfer in step 1, the GMLC 1250 could assume that this is a new emergency call and proceed to establish it—e.g., as in FIG. 8 if VCC for CS emergency call originations is supported. If the call record is not found and if the UE indicated VCC domain transfer in step 1, the GMLC 1250 would instead return a MAP Subscriber Location Report return error to the VMSC (not shown) and the VMSC would release the call attempt. This would enable the UE to release the call from the user perspective and allow the user to retry the emergency call since VCC domain transfer would have failed. Otherwise, if the call record is found, the GMLC 1250 returns a MAP Subscriber Location Report ACK to the VMSC 1230 carrying the VDN needed to establish the new access leg. The VDN would have been obtained by the LRF 1250 when the call was first originated (e.g., in step 6 in FIG. 7 or step 9 in FIG. 8) and would be provided to GMLC 1250 when it locates the call record in the LRF. The VDN could be carried by the existing NA-ESRK or existing NA-ESRD parameter in the MAP Subscriber Location Report ACK. The GMLC 1250 also stores the information received from the VMSC 1230 in step 2.

Step 4 (IAM (VDN)). The VMSC 1230 routes the new leg based on the VDN received in step 3. If the VDN is conveyed using the existing NA-ESRK or NA-ESRD parameter then the call routing can be the same as that use for normal emergency call origination. Based on VDN routing, the VMSC 1230 routes the call towards the initial visited IMS network via an MGCF 1240 in the visited network.

Step 5 (INVITE (VCC Application)). The MGCF 1240 initiates an INVITE towards an I-CSCF in the visited IMS (not shown) or possibly the MGCF 1240 routes directly to the E-CSCF 1260, an S-CSCF (not shown) or VCC Application 1270. The I-CSCF or S-CSCF (not shown) or E-CSCF 1260, based on the VDN, instigates PSI based application server termination to the VCC Application 1270.

Step 6 (UPDATE or reINVITE). The VCC Application 1270 updates the outgoing Access Leg by communicating the SDP of the Access Leg established in the transferring-in domain to the remote end via the E-CSCF 1260. Access Leg update happens according to SIP session modification procedures in IETF RFC 3261. The VCC Application 1270 may also explicitly indicate CS domain transfer to the E-CSCF 1260.

Step 7 (Location update). The E-CSCF 1260 sends a Location Update to the anchor LRF 1250 with the new SDP information. At a minimum, the E-CSCF 1260 indicates to the LRF 1250 that there has been a CS domain transfer. The LRF 1250 correlates this indication with the indication of domain transfer determined in step 3 and determines that the UE 1210 has now changed domain to that indicated in step 2. The LRF 1250 communicates this information to the GMLC selected by the VMSC 1230 in step 2.

Step 8 (UPDATE or reINVITE). The update continues towards the PSAP (as illustrated in FIG. 10A) or to the MGCF (as illustrated in FIG. 10B).

Step 9 (Source access leg release). The new call leg in the transferring-in CS domain is established between the VCC Application 1270, E-CSCF 1260 or S-CSCF if present, I-CSCF if present, MGCF 1240, VMSC 1230 and UE 1210.

Step 10 (Remainder of CS Call Establishment). The source Access Leg which is the Access leg previously established over IMS is released. The UE 1210 should de-register if possible in the visited network P-CSCF and home network S-CSCF.

In one embodiment, in step 1 of FIG. 12, a VCC indication could be included in the Emergency Category parameter in the Emergency Setup message as a new service category (since there are currently 3 spare bits allowing up to 3 new service categories to be defined). In this embodiment, procedure B could be initiated by the UE instead of procedure A (if both procedures are allowed) based on the following information:

(m) An indication from the original visited network to the UE that procedure B is supported.

(n) Determination by the UE that the new visited CS domain and the original visited IMS or CS domain are owned by the same operator or are part of the same network or have an arrangement to support procedure B.

(o) Information already in the UE (e.g. provided by the home network operator) that procedure B is supported.

The indication in (m) can be conveyed explicitly or implicitly to the UE using any of the alternatives (alternatives (e), (f) or (g)) described in section III.B for conveying VCC related information to a UE.

The determination in (n) could be based on detecting the same operator identification in the original visited domain and new visited CS domain—e.g. the same MCC-MNC. Determination might instead be based on system broadcast information received from the new visited network (e.g. information that the new visited network supports procedure B and possibly the identifications of other networks with which procedure B is supported). Alternatively determination of both (m) and (n) might be based on information stored in the SIM/USIM for the UE (e.g., as allowed in (o)) identifying all operators who have an arrangement to support procedure B.

Besides allowing domain transfer for unregistered UEs, procedure B also enables the anchor LRF to make use of the normal location procedure defined in 3GPP TS 23.271 (e.g., in clause 9.1.3) to locate a UE that has originated an emergency call. This is enabled due to steps 2 and 3 in FIG. 12 in which the VMSC obtains and stores information concerning the GMLC, and the LRF and GMLC obtain and store information concerning the VMSC. This then permits a CS-MT-LR without the need to query the UE's home HSS/HLR.

In one embodiment, a further aspect of procedure B is that the call origination procedure at the VMSC can be identical to that for a normal circuit mode emergency call (e.g., as defined in 3GPP TS 23.271 and joint TIA/EIA/ATIS J-STD-036) and/or identical to that for VCC support for a CS originated emergency call as described in FIG. 8. From the perspective of the GMLC, the procedure is also almost identical to that for a normal circuit mode emergency call with regard to the MAP signaling transaction with the VMSC.

In the case of 3GPP2, FIG. 12 is also applicable to describe procedure B for IMS to CS domain transfer except that in addition to replacing the VCC application by a 3GPP2 analogous entity, the 3GPP MAP messages shown in steps 2 and 3 would also be replaced by analogous 3GPP2 messages. In this case, the 3GPP2 messages in step 2 and 3 would be the 3GPP2 MAP Origination Request and MAP Origination Request Ack, respectively; the MSISDN in steps 2 and 3 would be replaced by the Mobile Identification Number (MIN) or Mobile Directory Number (MDN) and the GMLC in FIG. 12 would be replaced by the 3GPP2 Mobile Position Center (MPC).

VI.B. Domain Transfer CS to IMS

Two alternative procedures are described herein to support domain transfer for an emergency call from the CS domain to the IMS domain.

VI.B.1. Domain Transfer CS to IMS—procedure C

Figure 13:
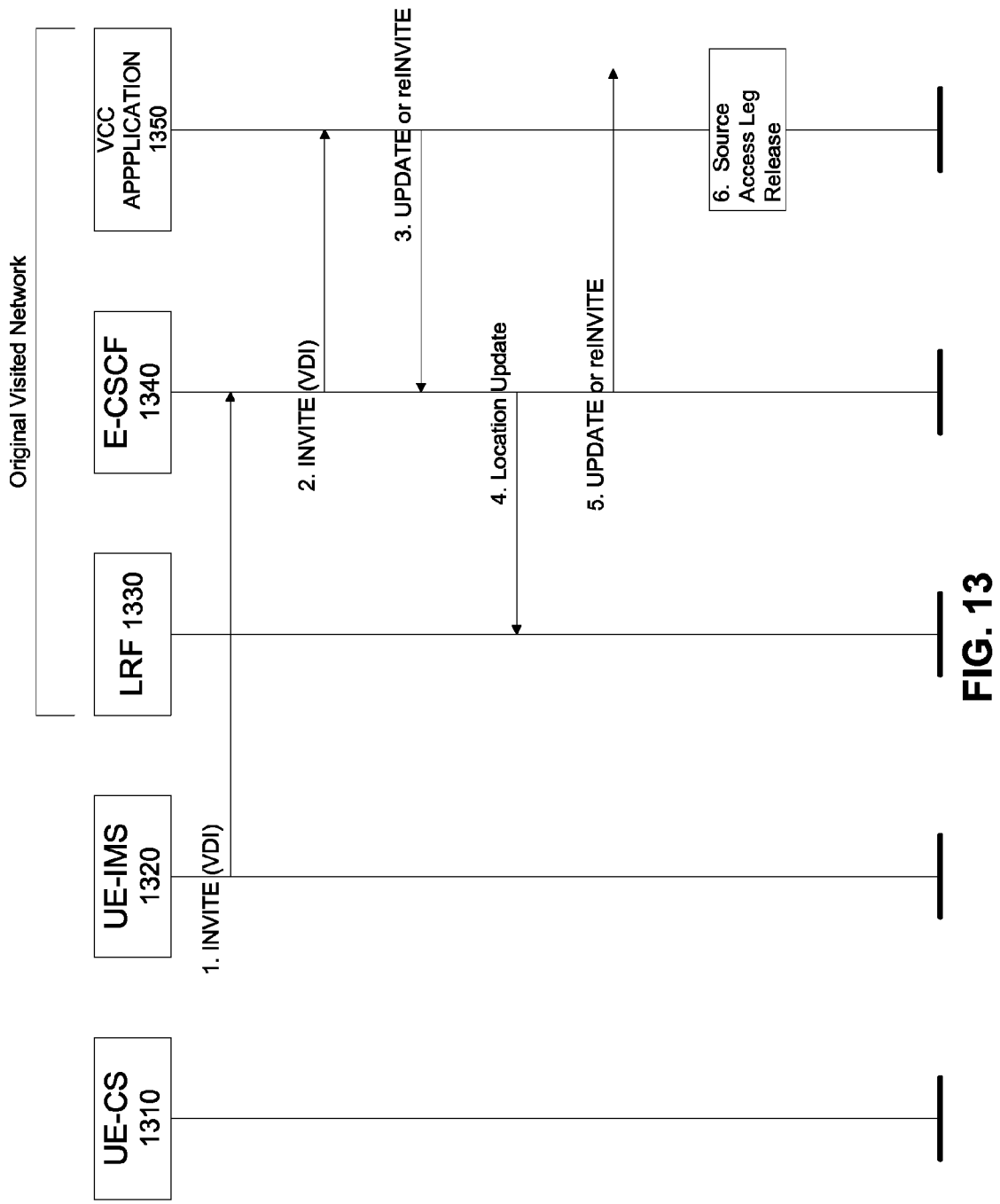
FIG. 13 illustrates an exemplary implementation of domain transfer CS to IMS.

In procedure C described in this section, the VCC capable UE behaves as for normal VCC (described in 3GPP TS 23.206) and originates a new call leg in the IMS domain to the VCC Application using the VDI obtained from the visited network or home network using any of alternatives (e), (f), (g) or (h) described in section III.B above. The call is treated like a normal originating SIP call and thus is only applicable to a UE that has sufficient credentials to register in the new visited network. It is illustrated in FIG. 13.

Step 1 (INVITE (VDI)). If the user is not registered with IMS at the time when the UE 1310 determines a need for Domain Transfer to IMS, the UE 1310 initiates Registration with IMS as specified in 3GPP TS 23.206. It subsequently initiates an IMS originated session toward the VCC Application 1350 in the original visited network using the VDI obtained earlier from the visited network (e.g. as described in section IV above and in FIGS. 7 and 8) to establish an Access Leg via IMS and request Domain Transfer of the active CS session to IMS. The SIP INVITE may be routed through a P-CSCF in either the new visited network or home network (not shown) and an S-CSCF in the home network (not shown) and will eventually reach either an S-CSCF (not shown) or preferably the E-CSCF 1340 in the original visited network.

Step 2 (INVITE (VDI)). The IMS session is processed at an S-CSCF (not shown) or the E-CSCF 1340 in the original visited network and delivered to the VCC Application 1350.

Step 3 (UPDATE or reINVITE). The VCC Application 1350 completes the establishment of the new incoming Access Leg via IMS. The VCC Application 1350 performs the Domain Transfer by updating the Remote Leg with connection information of the newly established Access Leg using the Access Leg Update procedure as specified in 3GPP TS 23.206. The UPDATE or ReINVITE is sent to the E-CSCF 1340 used to originate the call (e.g. according to FIG. 7 or FIG. 8). The VCC Application 1350 may also explicitly indicate domain transfer to the E-CSCF 1340.

Step 4 (Location update). The E-CSCF 1340 updates the anchor LRF 1330 with the new SDP information—e.g. indicates that the UE 1310 is now using the IMS domain and provides the UE IP address.

Step 5 (UPDATE or reINVITE). The update continues towards the PSAP (as illustrated in FIG. 10A) or MGCF (as illustrated in FIG. 10B).

Step 6 (Source access leg release). The source Access Leg which is the Access leg previously established over CS is subsequently released as specified in 3GPP TS 23.206. This includes releasing the previous incoming CS leg through the E-CSCF 1340.

Once procedure C has been completed, it will be possible to continue location support for the UE because the LRF should now have the UE's IP address and can thus invoke OMA SUPL (or any other location solution involving IP transport such as 3GPP2 X.S0024). However, use of the 3GPP control plane solution to enable location of the UE for GPRS access will only be possible using the more general PS-MT-LR procedure described in clauses 9.1.1 and 9.1.6 of 3GPP TS 23.271 in which the LRF queries the UE's home HLR/HSS for the visited SGSN address.

VI.B.2. Domain Transfer CS to IMS—Procedure D

Figure 14:
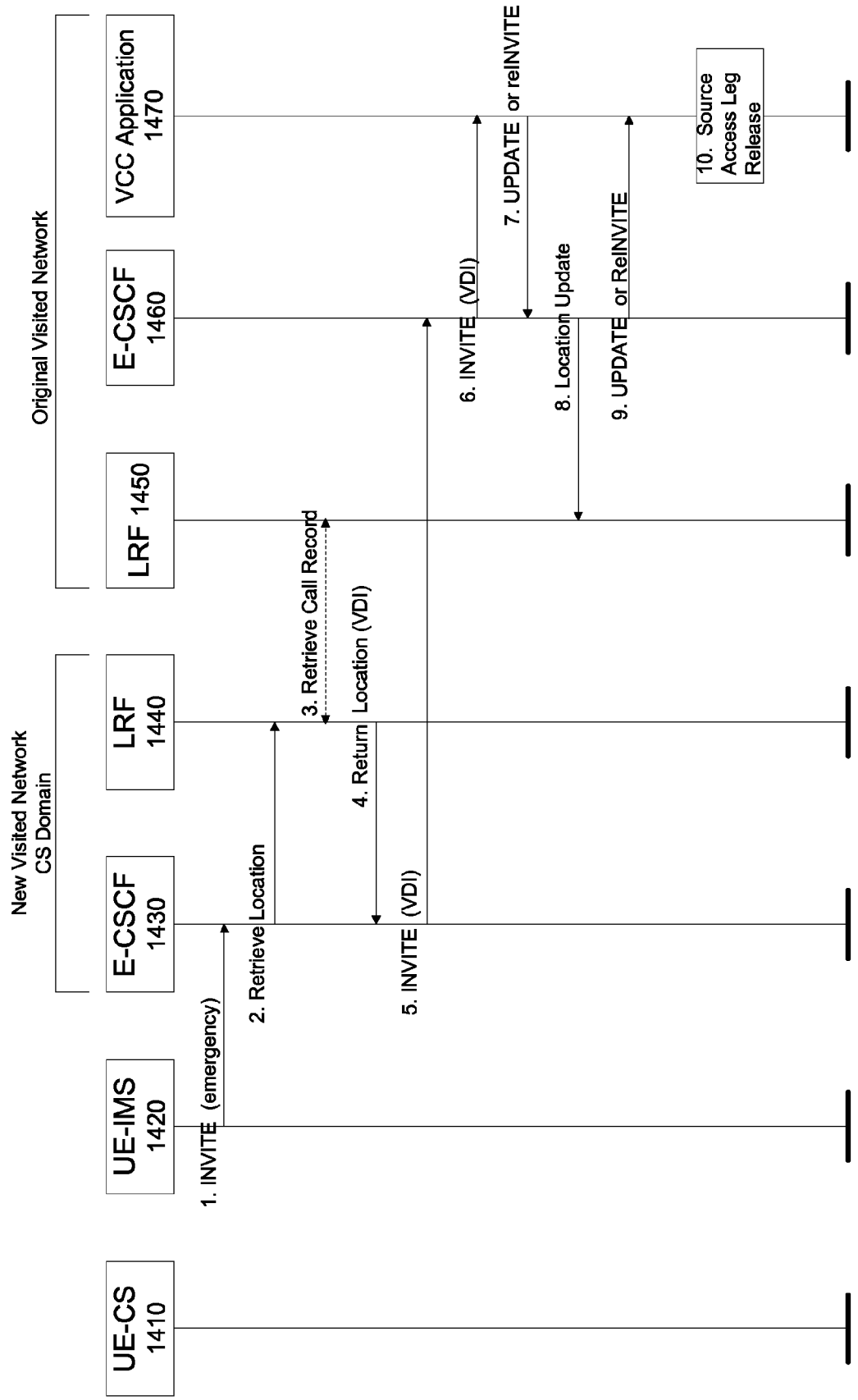
FIG. 14 illustrates an exemplary alternative domain transfer from CS to IMS.

In an alternative embodiment, procedure D supporting CS to IMS domain transfer would be applicable to a UE 1410 whether or not it has sufficient credentials to register in the new PLMN. The procedure places fewer restrictions on continued location support. FIG. 14 illustrates an exemplary implementation of procedure D.

Step 1 (INVITE(emergency)). Prior to sending the INVITE, the UE 1410 executes an emergency registration in the new visited IMS network if it contains adequate credentials as defined in 3GPP TS 23.167 (i.e., a normal registration is not used). This will be needed to support call back to the UE 1420 (via the new visited network) and to authenticate the UE 1420 in the new visited IMS. The UE 1410 then sends an INVITE indicating an IMS emergency call to a P-CSCF (not shown in FIG. 14) in the new visited network. The SIP To header in the INVITE may contain a SIP URI indicating VCC domain transfer for an existing emergency call. Such a SIP URI can easily be added to other SIP URIs needed to support emergency calls without requiring any new SIP signaling changes. The SIP INVITE may also contain a Route header containing address information for the original visited network—for example, a SIP URI created from the MCC-MNC (Mobile Country Code and Mobile Network Code) for the original visited network, and possibly the cell ID and location area from which the call first originated. Based on the indication of VCC domain transfer for an existing emergency call, the P-CSCF does not invoke VCC support (e.g. by transferring the SIP INVITE to a VCC Application in the new visited network as allowed in FIG. 7) but instead passes the INVITE to a local E-CSCF 1430.

Step 2 (Retrieve location). Based on the indication of VCC domain transfer, the E-CSCF 1430 may proceed to step 5 if any address information for the original visited network received in step 1 is precise enough to determine the VDI needed for subsequent routing. Otherwise the E-CSCF 1430 requests location and routing information from an LRF 1440—either a local LRF 1440 or preferably an LRF 1450 in the original visited network as indicated by Route header information provided by the UE 1420 in step 1. The E-CSCF 1430 provides the LRF 1440 with UE identification information—e.g. IMSI, MSISDN, IMEI. The E-CSCF 1430 also indicates VCC domain transfer Step 3 (Retrieve call record). The LRF 1440 may interact with other LRFs 1450 to search for the original call record established in the anchor LRF when the emergency call was first originated according to FIG. 7 or FIG. 8. If the LRF 1430 is in the original visited network (or supports the original visited network), the interaction and search will be more limited—e.g. the LRF may itself be the anchor LRF.

Step 4 (Return location(VDI)). Provided that the call record is found, the LRF 1430 returns routing information to the E-CSCF 1420 in the form of a VDI.

Step 5 (INVITE(VDI)). Using the VDI determined in step 2 or provided by the LRF 1440 in step 4, the E-CSCF 1430 forwards the INVITE either directly to the VCC Application 1470 in the original visited network or to the IMS Core (e.g. the E-CSCF 1460) in the original visited network.

Step 6 (INVITE(VDI)). If needed, the IMS Core (e.g. E-CSCF 1460) in the original visited network forwards the INVITE to the VCC Application 1470.

Step 7 (UPDATE or reINVITE). The VCC Application 1470 updates the outgoing Access Leg by communicating the SDP of the Access Leg established in the transferring-in domain to the remote end via the E-CSCF 1460. The VCC Application 1470 may also explicitly indicate domain transfer to the E-CSCF 1460.

Step 8 (Location update). The E-CSCF 1460 updates the anchor LRF 1450 with the new SDP information—e.g., indicates that the UE 1420 is now using the IMS domain and provides the UE IP address.

Step 9 (UPDATE or reINVITE). The update continues towards the PSAP (as illustrated in FIG. 10A) or MGCF (as illustrated in FIG. 10B).

Step 10 (Source access leg release). The source Access Leg which is the Access leg previously established over CS is subsequently released as specified in 3GPP TS 23.206. This includes releasing the previous incoming CS leg through the E-CSCF. The procedure in FIG. 14 is applicable to both registered and unregistered UEs. Continuing location support can also be the same as that for procedure C—e.g., by using OMA SUPL with the UE IP address provided to the anchor LRF 1450 in step 8 in FIG. 14 or using the 3GPP PS-MT-LR procedure for location with GPRS access. However, as an added benefit, it may be possible to use the 3GPP PS-NI-LR and PS-MT-LR procedures specific to emergency calls defined in 3GPP TS 23.271 (in clauses 9.1.6A and 9.1.7). This can be enabled if the UE indicates an emergency call for GPRS access and/or GPRS PDP context establishment. This can trigger the SGSN into instigating a PS-NI-LR either to obtain location or provide its address to a GMLC. If the GMLC is associated with the anchor LRF, it will be possible to provide the anchor LRF with the Serving GPRS Support Node (SGSN) address thereby enabling use of a PS-MT-LR without having to query the home HLR/HSS (and also allowing location for an unauthorized UE with possibly no HLR/HSS). This capability may, however, be restricted to cases where the same operator owns both the new and original visited networks.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal (or UE). In the alternative, the processor and the storage medium may reside as discrete components in a user terminal (or UE).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for supporting Voice Call Continuity (VCC) for emergency calls in a wireless access environment, comprising:

a receiver for receiving a request for an emergency call via a radio link from a User Equipment (UE) at a node in a visited network, wherein the emergency call is destined for a Public Safety Answering Point (PSAP);

a component of the visited network for establishing the emergency call by having support for location anchored in the visited network a VCC application in the visited network for routing the emergency call and for moving the emergency call from one to the other of a circuit switched domain and a packet switched domain, wherein the visited network provides continuing support for location.

2. The apparatus of claim 1, further comprising:

wherein the VCC application is further located in a visited internet-protocol multimedia subsystem (IMS) to facilitate domain transfers between the visited IMS subsystem and a circuit-switched (CS) subsystem; and an emergency call session control function (E-CSCF) subsystem in the visited IMS subsystem that is operatively coupled to the VCC application to facilitate domain transfers between the visited IMS subsystem and the CS subsystem.

3. The apparatus of claim 2, further comprising a location retrieval function (LRF) subsystem that is operatively coupled to the E-CSCF subsystem, and that performs functions related to retrieval of location information.

4. The apparatus of claim 2, wherein the visited IMS subsystem is in a visited network.

5. The apparatus of claim 2, wherein the visited IMS subsystem is in a home network.

6. The apparatus of claim 2, wherein the visited IMS subsystem further comprises a media gateway control function (MGCF) subsystem operatively coupled to the E-CSCF subsystem.

7. The apparatus of claim 6, wherein the visited IMS subsystem further comprises a media gateway (MGW) subsystem operatively coupled to the MGCF subsystem.

8. The apparatus of claim 6, wherein the CS subsystem further comprises a voice mobile-services switching centre (VMSC) subsystem capable of communicating with the MGCF subsystem.

9. The apparatus of claim 2, further comprising at least one user equipment (UE) unit.

10. The apparatus of claim 9, further comprising a proxy call session control function (P-CSCF) subsystem operatively coupled to the UE unit to facilitate communication.

11. The apparatus of claim 1, further comprising:

means for facilitating domain transfers between a visited internet-protocol multimedia subsystem (IMS) subsystem and a circuit-switched (CS) subsystem; and means in the visited IMS subsystem that is operatively coupled to the first means for facilitating domain transfers between the visited IMS subsystem and the CS subsystem.

12. The apparatus of claim 1, wherein the component comprises a Location Retrieval Function (LRF).

13. The apparatus of claim 1, wherein the component comprises a Gateway Mobile Location Center (GMLC).

14. The apparatus of claim 1, wherein the visited network is further configured for establishing the emergency call in a packet switched domain by having the location services component record call information including use of the VCC application.

15. The apparatus of claim 14, wherein the visited network is further configured for moving the emergency call from the packet switched domain to a circuit switched domain by querying the location services component for retrieving the VCC information and routing a request for handover to the VCC application.

16. The apparatus of claim 1, wherein the visited network is further configured for establishing the emergency call in a circuit switched domain.

17. The apparatus of claim 16, wherein the visited network is further configured for moving the emergency call from the circuit switched domain to a packet switched domain by querying the location services component for retrieving the VCC information and routing a request for handover to the VCC application.

18. The apparatus of claim 1, wherein the visited network is further configured for establishing the emergency call by having the location services component in the visited network route an emergency call request to the VCC application in the visited network.

19. The apparatus of claim 18, wherein the visited network is further configured for moving the emergency call from the circuit switched domain to a packet switched domain by sending a request for handover to the VCC application.

20. A method for supporting Voice Call Continuity (VCC) for emergency calls in a wireless access environment, comprising:

receiving a request for an emergency call via a radio link at a node in a visited network, wherein the emergency call is destined for a Public Safety Answering Point (PSAP);

establishing the emergency call by having support for location anchored in the visited network, wherein the emergency call is routed via a VCC application in the visited network; and moving the emergency call from one to the other of a circuit switched domain and a packet switched domain by sending a request for handover to the VCC application, wherein the visited network provides continuing support for location.

21. The method of claim 20, further comprising:

facilitating domain transfers between an internet-protocol multimedia subsystem (IMS) and a circuit-switched (CS) subsystem through at least one of the VCC application or an emergency call session control function (E-CSCF).

22. The method of claim 21, further comprising supporting the emergency call from an authorized User Equipment (UE).

23. The method of claim 21, further comprising supporting the emergency call from an unauthorized User Equipment (UE).

24. The method of claim 21, further comprising supporting the emergency call from a User Equipment (UE) in a home network.

25. The method of claim 21, further comprising retrieving location of a User Equipment (UE) that follows a VCC transfer from a first wireless access network to a second wireless access network.

26. The method of claim 25, further comprising invoking the E-CSCF on an outgoing call leg from the VCC application to enable continuity of location support.

27. The method of claim 21, further comprising receiving VCC-related information from a User Equipment (UE).

28. The method of claim 21, further comprising indicating VCC in an emergency SETUP message for an IMS-to-CS transfer.

29. The method of claim 21, further comprising using an existing Mobile Application Part (MAP) query from a Mobile-Services Switching Centre (MSC) to a Gateway Mobile Location Center (GMLC) to route the emergency call to the VCC application in a manner partly or completely transparent to the MSC.

30. The method of claim 21, further comprising performing a location update by a Location Retrieval Function (LRF).

31. The method of claim 21, further comprising using a Gateway Mobile Location Center (GMLC) query from a Mobile-Services Switching Centre (MSC) to facilitate the domain transfers in a manner partly or completely transparent to the MSC.

32. The method of claim 21, further comprising anchoring of location retrieval in an anchor Location Retrieval Function (LRF) when the emergency call is set up.

33. The method of claim 20, wherein the visited network comprises a Location Retrieval Function (LRF) for providing continuing support for location.

34. The method of claim 20, wherein the visited network comprises a Gateway Mobile Location Center (GMLC) for providing continuing support for location.

35. The method of claim 20, further comprising establishing the emergency call in a packet switched domain by having the location services component record call information including use of the VCC application.

36. The method of claim 35, further comprising moving the emergency call from the packet switched domain to a circuit switched domain by querying the location services component for retrieving the VCC information and routing a request for handover to the VCC application.

37. The method of claim 20, further comprising establishing the emergency call in a circuit switched domain.

38. The method of claim 37, further comprising moving the emergency call from the circuit switched domain to a packet switched domain by querying the location services component for retrieving the VCC information and routing a request for handover to the VCC application.

39. The method of claim 20, further comprising establishing the emergency call by having the location services component in the visited network route an emergency call request to the VCC application in the visited network.

40. The method of claim 39, further comprising moving the emergency call from the circuit switched domain to a packet switched domain by sending a request for handover to the VCC application.

41. A computer program product for supporting Voice Call Continuity (VCC) for emergency calls in a wireless access environment, comprising:
a non-transitory computer-readable storage medium, comprising:
a first set of instructions for causing a computer to receive a request for an emergency call via a radio link from a User Equipment (UE) at a node in a visited network, wherein the emergency call is destined for a Public Safety Answering Point (PSAP);
a second set of instructions for causing the computer to establish the emergency call by having support for location anchored in the visited network, wherein the emergency call is routed via a VCC application in the visited network; and
a third set of instructions for causing a computer to move the emergency call from one to the other of a circuit switched domain and a packet switched domain by sending a request for handover to the VCC application,
wherein the visited network provides continuing support for location.

42. The computer program product of claim 41, further comprising a set of instructions for causing the computer to facilitate domain transfers between an internet-protocol multimedia subsystem (IMS) and a circuit-switched (CS) subsystem through an emergency call session control function (E-CSCF); and
a set of instructions for causing the computer to retrieve a location of the User Equipment (UE) that follows a VCC transfer from a first wireless access network to a second wireless access network.

43. The computer program product of claim 42, wherein the UE is an authorized UE.

44. The computer program product of claim 42, wherein the UE is an unauthorized UE.

45. The computer program product of claim 42, wherein the UE is in a home network.

46. At least one processor for supporting Voice Call Continuity (VCC) for emergency calls in a wireless access environment, comprising:
a first module for receiving a request for an emergency call via a radio link from a User Equipment (UE) at a node in a visited network, wherein the emergency call is destined for a Public Safety Answering Point (PSAP);
a second module for establishing the emergency call by having support for location anchored in the visited network, wherein the emergency call is routed via a VCC application in the visited network; and
a third module for moving the emergency call from one to the other of a circuit switched domain and a packet switched domain by sending a request for handover to the VCC application,
wherein the visited network provides continuing support for location.

47. An apparatus for supporting Voice Call Continuity (VCC) for emergency calls in a wireless access environment, comprising:
means for receiving a request for an emergency call via a radio link from a User Equipment (UE) at a node in a visited network, wherein the emergency call is destined for a Public Safety Answering Point (PSAP);
means for establishing the emergency call by having support for location anchored in the visited network, wherein the emergency call is routed via a VCC application in the visited network; and
means for moving the emergency call from one to the other of a circuit switched domain and a packet switched domain by sending a request for handover to the VCC application,
wherein the visited network provides continuing support for location.

* * * * *